United States Patent
Yu et al.

(10) Patent No.: US 11,538,238 B2
(45) Date of Patent: Dec. 27, 2022

(54) METHOD AND SYSTEM FOR PERFORMING IMAGE CLASSIFICATION FOR OBJECT RECOGNITION

(71) Applicant: MUJIN, INC., Tokyo (JP)

(72) Inventors: Jinze Yu, Tokyo (JP); Jose Jeronimo Moreira Rodrigues, Tokyo (JP); Ahmed Abouelela, Tokyo (JP)

(73) Assignee: Mujin, Inc., Tokyo (JP)

( * ) Notice: Subject to any disclaimer, the term of this patent is extended or adjusted under 35 U.S.C. 154(b) by 213 days.

(21) Appl. No.: 16/991,510

(22) Filed: Aug. 12, 2020

(65) Prior Publication Data
US 2021/0213615 A1 Jul. 15, 2021

Related U.S. Application Data

(60) Provisional application No. 62/959,182, filed on Jan. 10, 2020.

(51) Int. Cl.
*B25J 9/00* (2006.01)
*G06V 20/10* (2022.01)
(Continued)

(52) U.S. Cl.
CPC .............. *G06V 20/10* (2022.01); *B25J 9/163* (2013.01); *B25J 9/1661* (2013.01); *B25J 9/1664* (2013.01);
(Continued)

(58) Field of Classification Search
CPC ...... G06V 20/10; G06V 10/22; G06V 10/443; G06V 10/462; G06V 10/56;
(Continued)

(56) References Cited

U.S. PATENT DOCUMENTS

2015/0254519 A1\* 9/2015 Kumar ................ G06Q 20/367
382/182

FOREIGN PATENT DOCUMENTS

| CN | 103679195 A | 3/2014 |
|---|---|---|
| CN | 109214420 A | 1/2019 |

(Continued)

OTHER PUBLICATIONS

Office Action dated Apr. 9, 2021 in Chinese Application No. 202011186066.6 (with English Translation).
(Continued)

*Primary Examiner* — Ian Jen
(74) *Attorney, Agent, or Firm* — Medler Ferro Woodhouse & Mills PLLC

(57) ABSTRACT

Systems and methods for classifying at least a portion of an image as being textured or textureless are presented. The system receives an image generated by an image capture device, wherein the image represents one or more objects in a field of view of the image capture device. The system generates one or more bitmaps based on at least one image portion of the image. The one or more bitmaps describe whether one or more features for feature detection are present in the at least one image portion, or describe whether one or more visual features for feature detection are present in the at least one image portion, or describe whether there is variation in intensity across the at least one image portion. The system determines whether to classify the at least one image portion as textured or textureless based on the one or more bitmaps.

20 Claims, 23 Drawing Sheets

(51) Int. Cl.
   *B25J 9/16* (2006.01)
   *G06N 20/00* (2019.01)
   *B25J 13/08* (2006.01)
   *G06K 9/62* (2022.01)
   *G06V 10/22* (2022.01)
   *G06V 10/56* (2022.01)
   *G06V 10/44* (2022.01)
   *G06V 10/46* (2022.01)
   *B65G 61/00* (2006.01)

(52) U.S. Cl.
   CPC ............ *B25J 9/1697* (2013.01); *B25J 13/08* (2013.01); *G06K 9/6268* (2013.01); *G06N 20/00* (2019.01); *G06V 10/22* (2022.01); *G06V 10/443* (2022.01); *G06V 10/462* (2022.01); *G06V 10/56* (2022.01); *B65G 61/00* (2013.01); *G06V 2201/06* (2022.01); *G06V 2201/07* (2022.01)

(58) Field of Classification Search
   CPC . G06V 2201/06; G06V 2201/07; B25J 9/163; B25J 9/1661; B25J 9/1664; B25J 9/1697; B25J 13/08; G06K 9/6268; G06N 20/00; B65G 61/00; G05B 2219/37555; G05B 2219/40053; G05B 2219/40564
   See application file for complete search history.

(56) References Cited

FOREIGN PATENT DOCUMENTS

| | | |
|---|---|---|
| CN | 110116406 A | 8/2019 |
| JP | S63-017735 A | 1/1988 |
| JP | H08-069533 A | 3/1996 |
| JP | 2019-063984 A | 4/2019 |
| JP | 2019-158427 A | 9/2019 |

OTHER PUBLICATIONS

Office Action dated Nov. 26, 2020, in Chinese Patent Appln. No. 2020-180428 (with English translation).

* cited by examiner

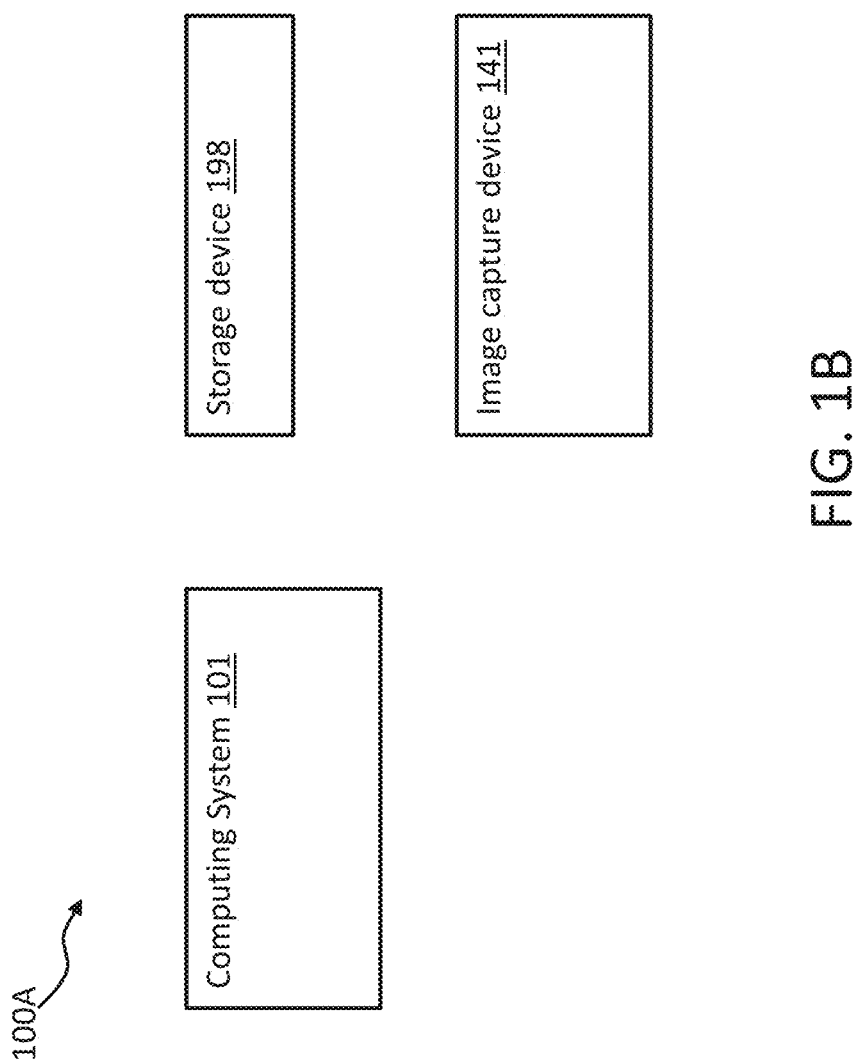

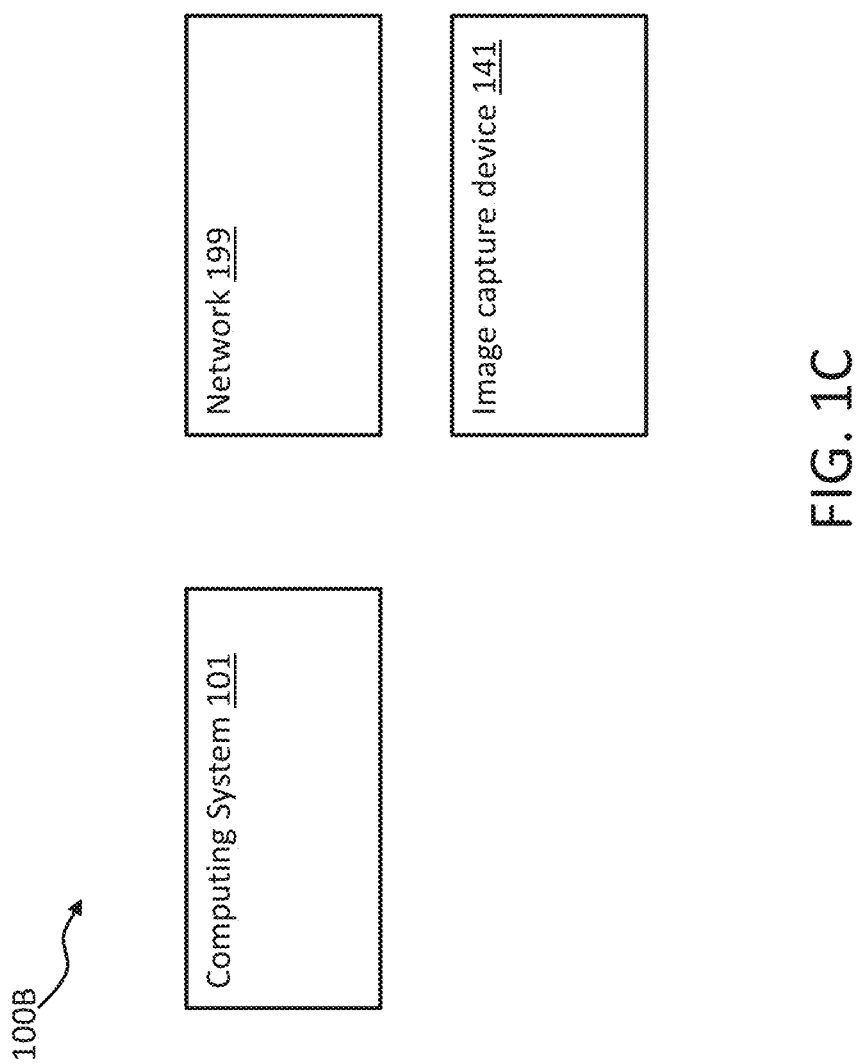

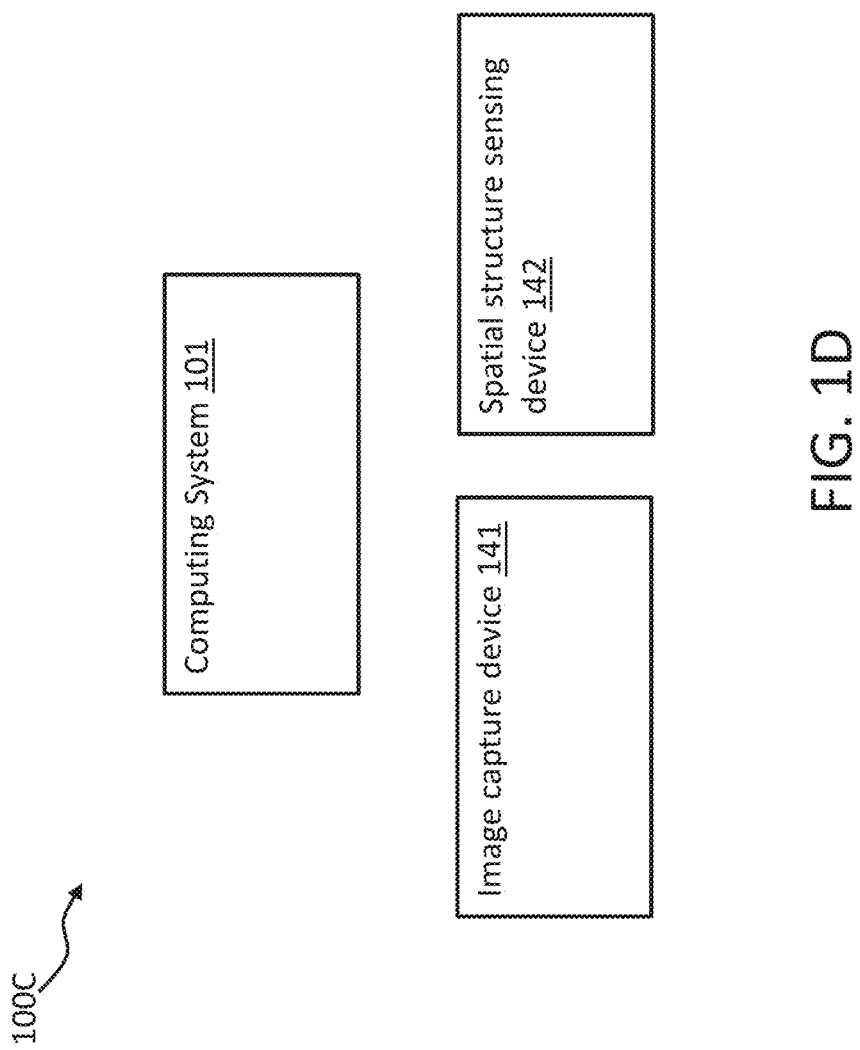

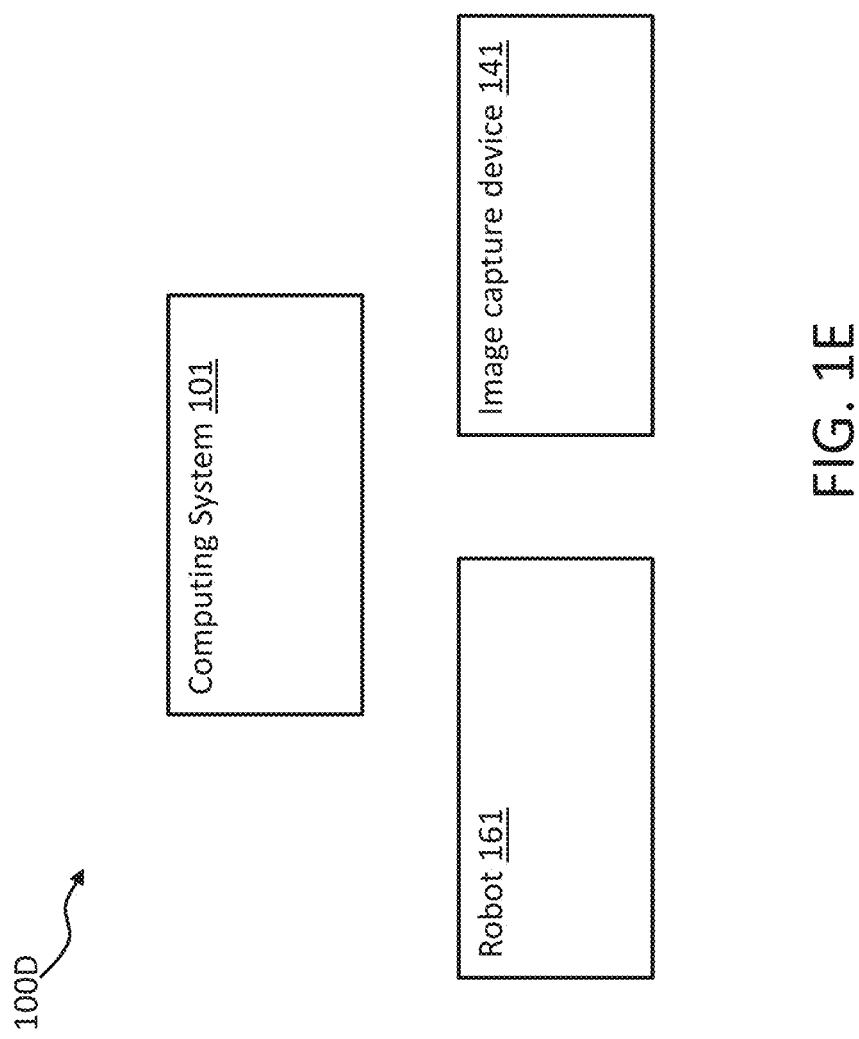

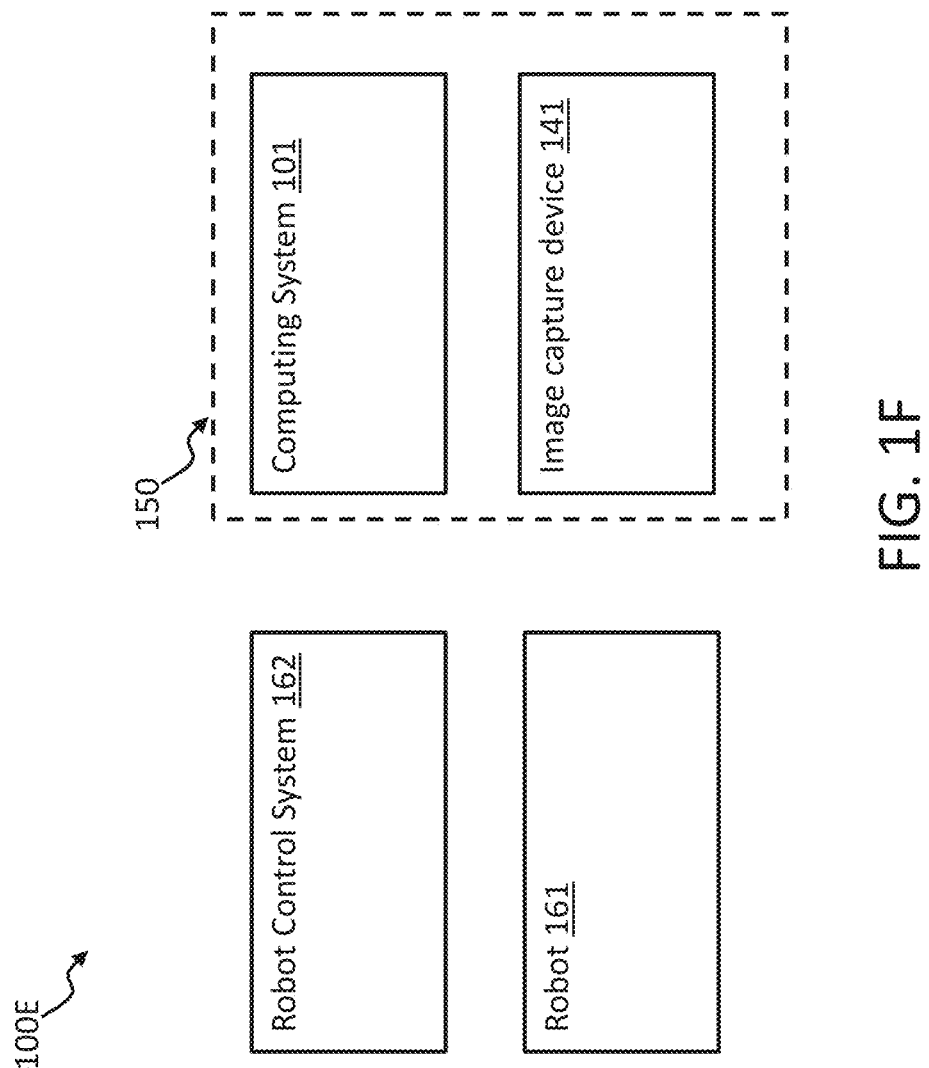

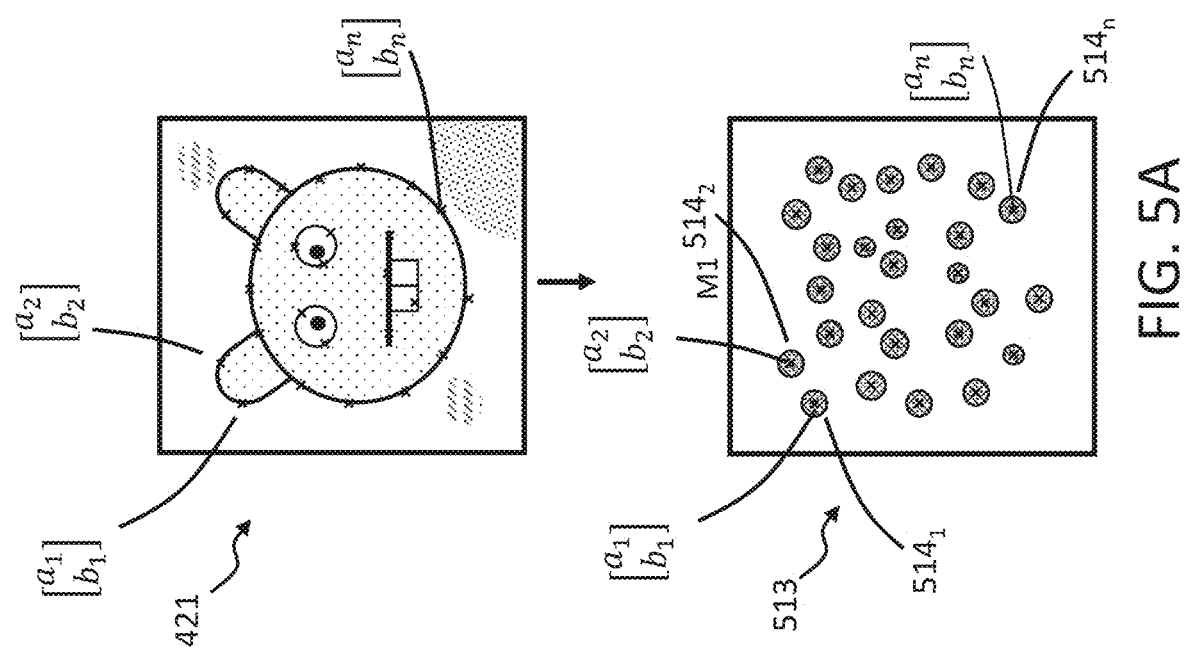

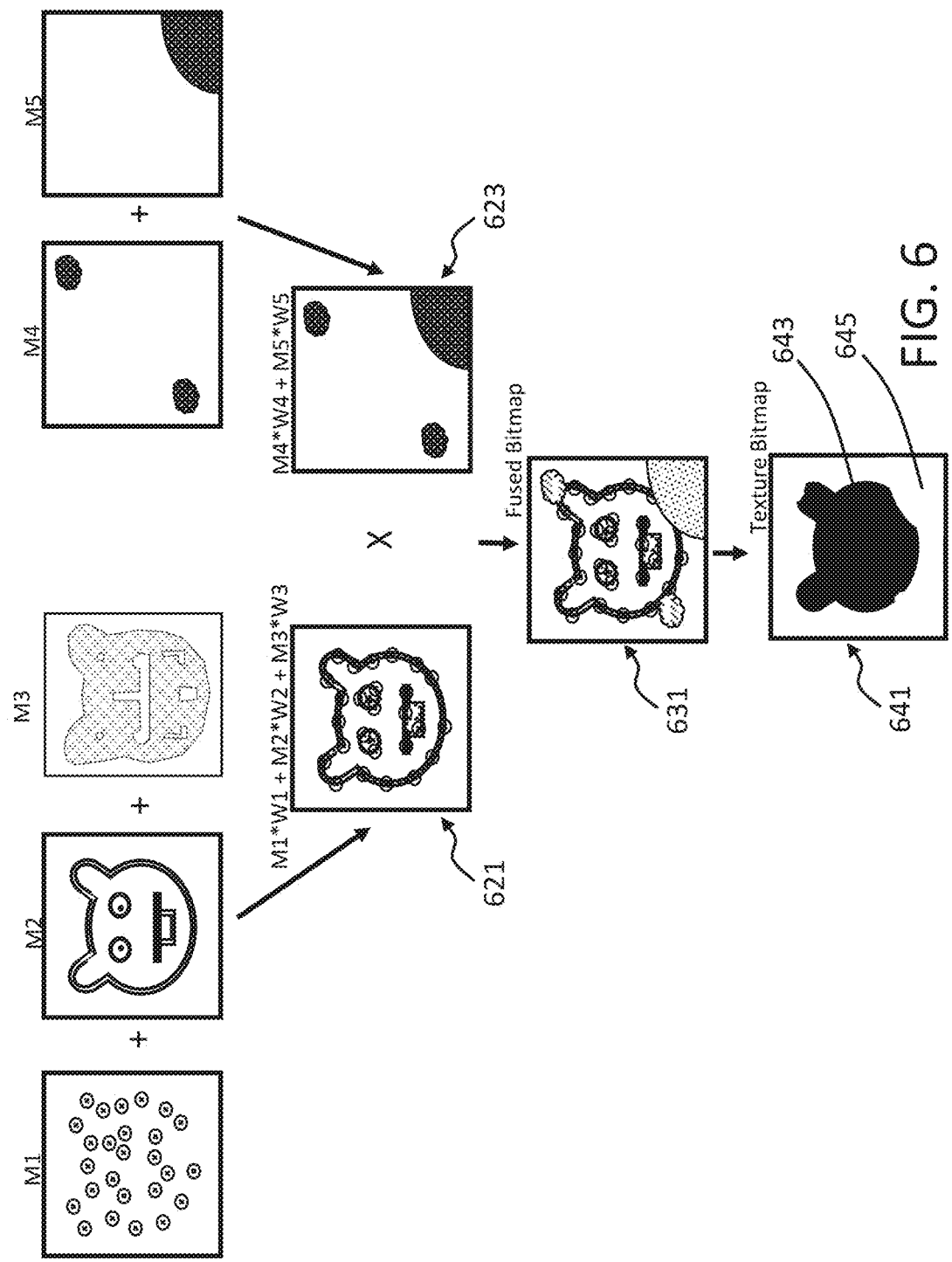

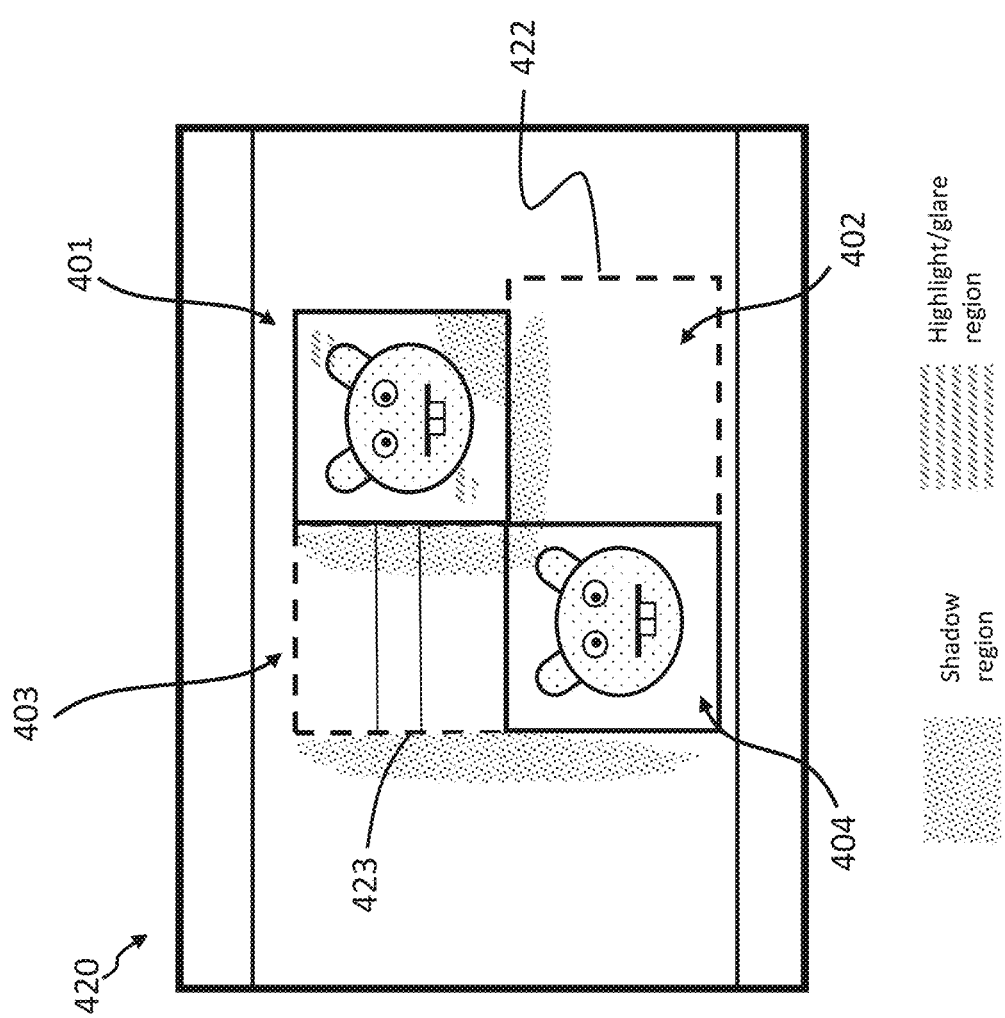

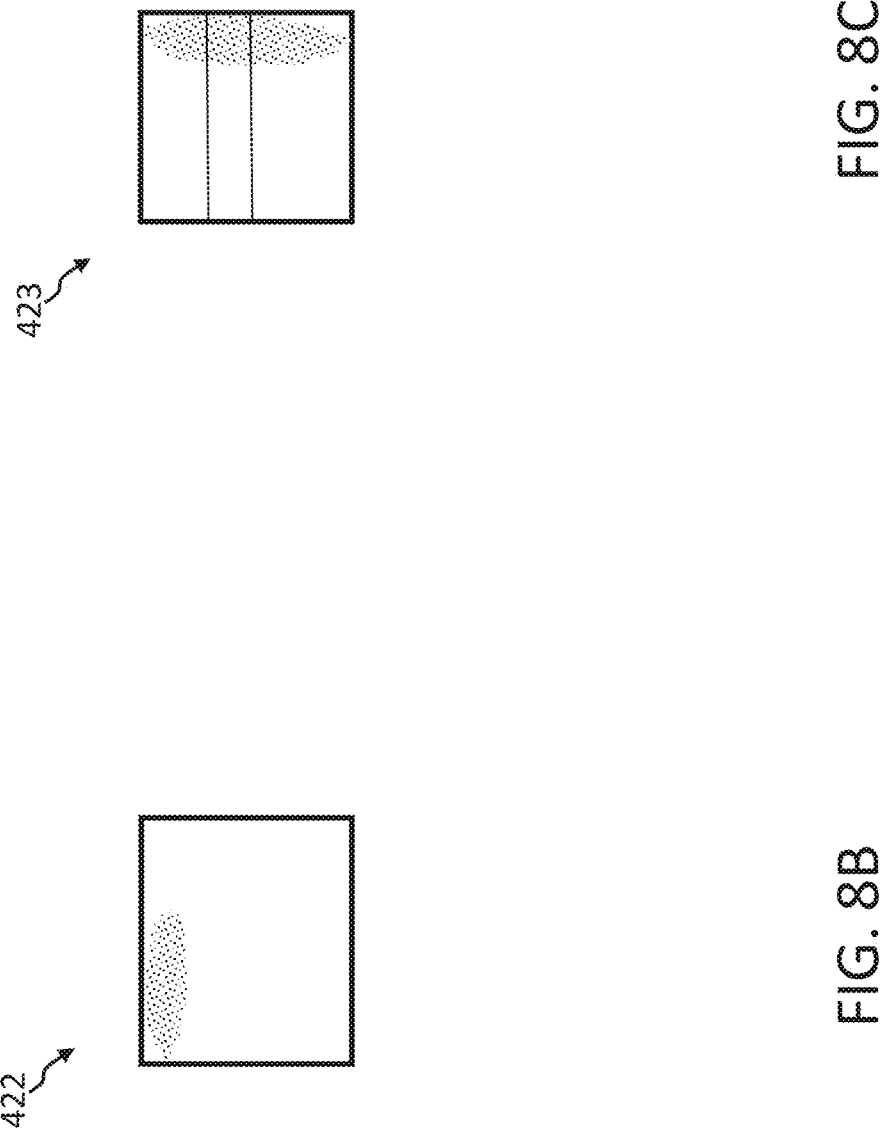

METHOD AND SYSTEM FOR PERFORMING IMAGE CLASSIFICATION FOR OBJECT RECOGNITION

CROSS-REFERENCE TO RELATED APPLICATION(S)

This application claims the benefit of U.S. Provisional Application No. 62/959,182, entitled "A Robotic System with Object Detection" and filed Jan. 10, 2020, the entire content of which is incorporated by reference herein.

FIELD OF THE INVENTION

The present disclosure is related to computing systems and methods for image classification. In particular, embodiments hereof are related to classifying an image or a portion thereof as being textured or textureless.

BACKGROUND OF THE INVENTION

As automation becomes more common, images which represent objects may be used to automatically extract information about the objects, such as boxes or other packages in a warehouse, factory, or retail space. The images may facilitate tasks such as automated package tracking, inventory management, or robot interaction with the objects.

SUMMARY

In an embodiment, a computing system including a non-transitory computer-readable medium and a processing circuit is provided. The processing circuit is configured to perform the following method: receiving an image by a computing system, wherein the computing system is configured to communicate with an image capture device, wherein the image is generated by the image capture device, and is for representing one or more objects in a field of view of the image capture device; generating, by the computing system, one or more bitmaps based on at least one image portion of the image, wherein the one or more bitmaps and the at least one image portion are associated with a first object of the one or more objects, and wherein the one or more bitmaps describe whether one or more visual features for feature detection are present in the at least one image portion, or describe whether there is variation in intensity across the at least one image portion. Additionally, the method includes determining, by the computing system, whether to classify the at least one image portion as textured or textureless based on the one or more bitmaps, and performing motion planning for robot interaction with the one or more objects based on whether the at least one image portion is classified as textured or textureless. In an embodiment, the method may be performed by executing instructions on the non-transitory computer-readable medium.

BRIEF DESCRIPTION OF THE FIGURES

FIGS. 1A through 1F illustrate a system for classifying an image or image portion as being textured or textureless, according to embodiments hereof.

FIGS. 5A-5E illustrate various bitmaps being generated based on an image portion, according to embodiments hereof.

FIG. 6 illustrates a fused bitmap and a texture bitmap being generated, according to an embodiment hereof.

FIGS. 8A-8C illustrate additional image portions which are classified as being textured or textureless, according to an embodiment hereof.

DETAILED DESCRIPTION OF THE FIGURES

Figure 1A:
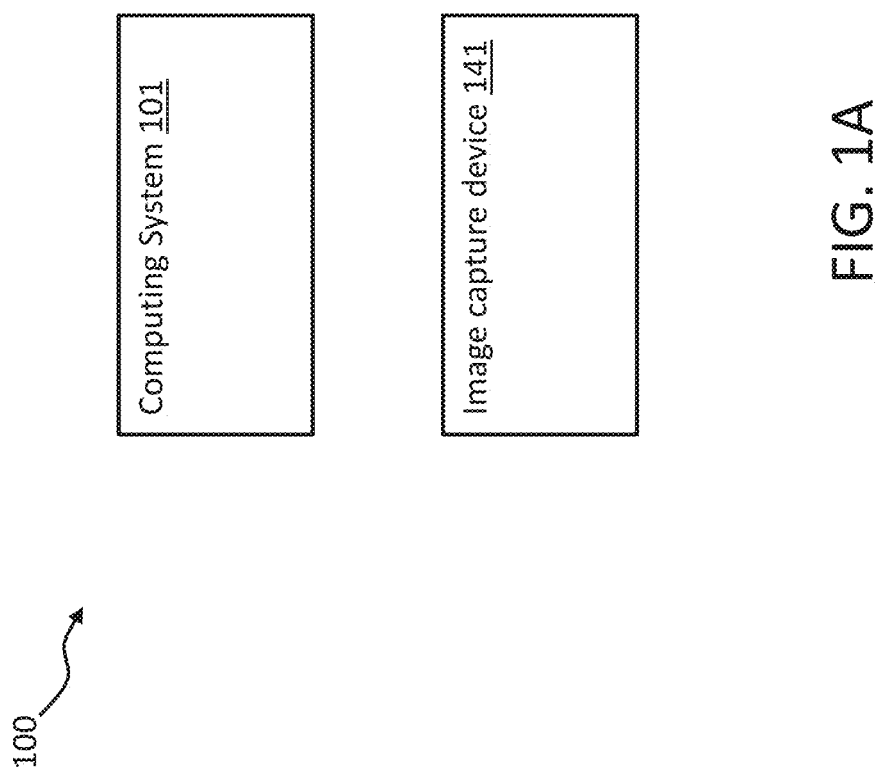

The present disclosure relates to systems and methods for classifying whether at least a portion of an image is textured or textureless. In some cases, the classification may be part of an object registration process for determining a characteristic of a group of one or more objects, such as boxes or other packages arriving to a warehouse or retail space. These characteristics may be determined so as to, e.g., facilitate automated handling of or other interaction with the group of objects, or with other objects having substantially the same design as the group of objects. In an embodiment, the portion of the image (also referred to as an image portion), which may be generated by a camera or other image capture device, may represent one of the one or more objects, and may provide an indication of: whether there is any visual detail which appears on a surface of the object, whether there is at least a certain amount or quantity of visual detail on the surface of the object, and/or whether there is at least a certain amount of variation in the visual detail. In some cases, the image portion may be used to generate a template for object recognition. Such cases may involve classifying whether an image or image portion forms a textured template or a textureless template. The template may describe, e.g., an appearance of the object (also referred to as object appearance), and/or a size of the object (also referred to as object size). In an embodiment, the template may be used to, e.g., identify any other object which has a matching object appearance, or that more generally matches the template. Such a match may indicate that the two objects belong to a same object design, and more specifically may indicate that they have other characteristics, such as object size, which are the same or substantially the same. In some scenarios, if a particular object has an appearance which matches an existing template, such a match may facilitate robot interaction. For instance, the match may indicate that the object has an object size (e.g., object dimensions or surface area) described by the template. The object size may be used to plan how the robot can pick up or otherwise interact with the object.

In an embodiment, classifying whether at least an image portion is textured or textureless may involve generating one or more bitmaps (also referred to as one or more masks) based on the image portion. In some cases, some or all of the one or more bitmaps may act as a heat map which indicates probability or strength of a particular property across various locations of the image portion. In some cases, some or all of the one or more bitmaps may be for describing whether the image portion has one or more visual features for object recognition. If the image portion has one or more such visual features, the one or more bitmaps may describe where the one or more features are located in the image portion. As an example, the one or more bitmaps may include a descriptor bitmap and/or an edge bitmap. The descriptor bitmap may describe whether the image portion has a descriptor, or describe where one or more descriptors are located in the image portion (the term "or" in this disclosure may refer to "and/or"). The edge bitmap may describe whether an edge is detected in the image portion, or describe where one or more edges are located in the image portion.

In an embodiment, some or all of the one or more bitmaps may be for describing whether there is variation in intensity across the image portion. For instance, such a variation (which may also be referred to as spatial variation) may indicate whether there is variation among pixel values of the image portion. In some cases, the spatial variation may be described through a standard deviation bitmap, which may describe local standard deviation among the pixel values of the image portion.

In an embodiment, classifying whether at least an image portion is textured or textureless may involve information from a single bitmap, or involve information from a fused bitmap that combines multiple bitmaps. For instance, the fused bitmap may be based on combining the descriptor bitmap, the edge bitmap, and/or the standard deviation bitmap. In some cases, the fused bitmap may be used to generate a texture bitmap, which may identify, e.g., whether the image portion has one or more textured regions, and whether the image portion has one or more textureless regions. In some cases, the texture bitmap may be used to describe a total area or total size occupied by the one or more textured regions or one or more textureless regions.

In an embodiment, the fused bitmap may be generated in a manner that compensates against an effect of a condition, such as too much light reflecting from a shiny object surface and causing glare to appear in the image portion, or light being blocked from an object surface and causing a shadow to appear in the image portion. The effect of the lighting condition may be described by, e.g., a highlight bitmap and/or a shadow bitmap. In some implementations, the fused bitmap may be generated further based on the highlight bitmap and/or the shadow bitmap.

In an embodiment, classifying whether at least an image portion is textured or textureless may be based on information provided by the descriptor bitmap, the edge bitmap, the standard deviation bitmap, the highlight bitmap, the shadow bitmap, fused bitmap, and/or the texture bitmap. For instance, the classification may be performed based on how many descriptors (if any) are detected in the image portion, a total area occupied by textured regions (if any) in the image portion, a total area occupied by textureless regions (if any) in the image portion, and/or standard deviation associated with the image portion or with the fused bitmap.

In an embodiment, the classification of whether a template, or more generally an image portion, is textured or textureless may affect how object recognition is performed based on the template. An object recognition which is based on such a classification is discussed in more detail in U.S. patent application Ser. No. 16/991,466, entitled "METHOD AND COMPUTING SYSTEM FOR OBJECT RECOGNITION OR OBJECT REGISTRATION BASED ON IMAGE CLASSIFICATION", filed on even date herewith, the entire content of which is incorporated by reference herein. In some cases, the classification may affect a level of confidence associated with a result of the object recognition. For example, a result of object recognition may be assigned a relatively high level of confidence if the object recognition is based on a textured template, and may be assigned a relatively low level of confidence if the object recognition is based on a textureless template. In some cases, the confidence level associated with a result of the object recognition may affect whether object recognition is to be performed again (e.g., using another object recognition technique), and/or affect how robot interaction with a particular object is planned. For instance, if object recognition for that object is based on a textureless template, robot interaction with that object may be controlled to proceed more cautiously or more slowly. In some cases, if an object recognition process determines that a particular image portion does not match any existing template, an object registration process may be performed to generate and store a new template based on the image portion.

FIG. 1A illustrates a system 100 for classifying an image or portion thereof. The system 100 may include a computing system 101 and an image capture device 141 (also referred to as an image sensing device). The image capture device 141 (e.g., a camera) may be configured to capture or otherwise generate an image which represents an environment in a field of view of the image capture device 141. In some cases, the environment may be, e.g., a warehouse or factory. In such cases, the image may represent one or more objects in the warehouse or factory, such as one or more boxes which are to receive robot interaction. The computing system 101 may receive the image directly or indirectly from the image capture device 141, and process the image to, e.g., perform object recognition. As discussed below in more detail, the processing may involve classifying whether the image or a portion thereof is textured or textureless. In some instances, the computing system 101 and the image capture device 141 may be located in the same premises, such as a warehouse or factory. In some instances, the computing system 101 and the image capture device 141 may be remote from each other. For example, the computing system 101 may be located at a data center that provides a cloud computing platform.

In an embodiment, the computing system 101 may receive an image from the image capture device 141 via a data storage device (which may also be referred to as a storage device) or via a network. For instance, FIG. 1B depicts a system 100A, which may be an embodiment of the system 100 of FIG. 1A, that includes the computing system 101, the image capture device 141, and further includes a data storage device 198 (or any other type of a non-transitory computer-readable medium). The data storage device 198 may be part of the image capture device 141 or may be separate from the image capture device 141. In this embodiment, the computing system 101 may be configured to access the image by retrieving (or, more generally, receiving) the image from the data storage device 198.

In FIG. 1B, the storage device 198 may include any type of non-transitory computer-readable medium (or media), which may also be referred to as a non-transitory computer readable storage device. Such non-transitory computer-readable medium or storage device may be configured to store and provide access to data. Examples of the non-transitory computer readable medium or storage device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a solid state drive, a static random access memory (SRAM), a portable compact disc read-only memory (CD-ROM), a digital versatile disk (DVD), and/or a memory stick.

FIG. 1C depicts a system 100B, which may be an embodiment of system 100/100A of FIGS. 1A and 1B, that includes a network 199. More specifically, the computing system 101 may receive an image generated by the image capture device 141 via the network 199. The network 199 may provide an individual network connection or a series of network connections to permit the computing system 101 to receive image data consistent with the embodiments hereof. In an embodiment, the network 199 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, or SDMA. Network communications may be conducted via any suitable protocol, including, e.g., http, tcp/ip, udp, ethernet, ATM, etc.

In an embodiment, the network 199 may be any type of network. The geographical scope of the network may vary widely and the network 199 can be a body area network (BAN), a personal area network (PAN), a local-area network (LAN), e.g., Intranet, a metropolitan area network (MAN), a wide area network (WAN), or the Internet. The topology of the network 199 may be of any form and may include, e.g., any of the following: point-to-point, bus, star, ring, mesh, or tree. The network 199 may be of any such network topology as known to those ordinarily skilled in the art capable of supporting the operations described herein. The network 199 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The network 199 may be a type of broadcast network, a telecommunications network, a data communication network, or a computer network.

In an embodiment, the computing system 101 and the image capture device 141 may communicate via a direct connection rather than a network connection. For instance, the computing system 101 in such an embodiment may be configured to receive an image from the image capture device 141 via a dedicated communication interface, such as a RS-232 interface, a universal serial bus (USB) interface, and/or via a local computer bus, such as a peripheral component interconnect (PCI) bus.

In an embodiment, the computing system 101 may be configured to communicate with a spatial structure sensing device. For example, FIG. 1D illustrates a system 100C (which may be an embodiment of system 100/100A/100B) that includes the computing system 101, the image capture device 141, and further includes a spatial structure sensing device 142. The spatial structure sensing device 142 may be configured to sense a 3D structure of an object in its field of view. For example, the spatial structure sensing device 142 may be a depth-sensing camera (e.g., a time-of-flight (TOF) camera or a structured light camera) that is configured to generate spatial structure information, such as a point cloud, which describes how a structure of the object is arranged in 3D space. More specifically, the spatial structure information may include depth information, such as a set of depth values, that describe depth of various locations on a surface the object. The depth may be relative to the spatial structure sensing device 142 or some other reference frame.

In an embodiment, an image which is generated by the image capture device 141 may be used to facilitate control of a robot. For instance, FIG. 1E illustrates a robot operation system 100D (which is an embodiment of system 100) that includes the computing system 101, the image capture device 141, and a robot 161. The image capture device 141 may be configured to generate an image that represents, e.g., an object in a warehouse or other environment, and the robot 161 may be controlled to interact with the object based on the image. For example, the computing system 101 may be configured to receive the image and to perform object recognition based on the image. The object recognition may involve determining, e.g., a size or shape of the object. In this example, the robot 161's interaction with the object may be controlled based on the determined size or shape of the object.

In an embodiment, the computing system 101 may form or be part of a robot control system (also referred to as a robot controller) that is configured to control movement or other operation of the robot 161. For instance, the computing system 101 in such an embodiment may be configured to perform motion planning for the robot 161 based on an image generated by the image capture device 141, and to generate one or more movement commands (e.g., motor commands) based on the motion planning. The computing system 101 in such an example may output the one or more movement commands to the robot 161 so as to control its movement.

In an embodiment, the computing system 101 may be separate from a robot control system, and may be configured to communicate information to the robot control system so as to allow the robot control system to control the robot. For instance, FIG. IF depicts a robot operation system 100E (which is an embodiment of the system 100 of FIG. 1A) that includes the computing system 101 and a robot control system 162 separate from the computing system 101. The computing system 101 and the image capture device 141 in this example may form a vision system 150 that is configured to provide to the robot control system 162 information about an environment of the robot 161, and more specifically about objects in that environment. The computing system 101 may function as a vision controller that is configured to process an image generated by the image capture device 141 to determine the information about the environment of the robot 161. The computing system 101 may be configured to communicate the determined information to the robot control system 162, which may be configured to perform motion planning for the robot 161 based on the information received from the computing system 101.

As stated above, the image capture device 141 of FIGS. 1A through 1F may be configured to generate image data which captures or forms an image which represents one or more objects in an environment of the image capture device 141. More specifically, the image capture device 141 may have a device field of view, and may be configured to generate an image which represents one or more objects in the device field of view. As used herein, image data refers to any type of data (also referred to as information) that describes an appearance of the one or more physical objects (also referred to as one or more objects). In an embodiment, the image capture device 141 may be or may include a camera, such as a camera configured to generate a two-dimensional (2D) image. The 2D image may be, e.g., a grayscale image or a color image.

As further stated above, the image generated by the image capture device 141 may be processed by the computing system 101. In an embodiment, the computing system 101 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 101 may be performed as part of a cloud computing platform. The computing system 101 may be a single computing device (e.g, a desktop computer or server), or may include multiple computing devices.

Figure 2A:
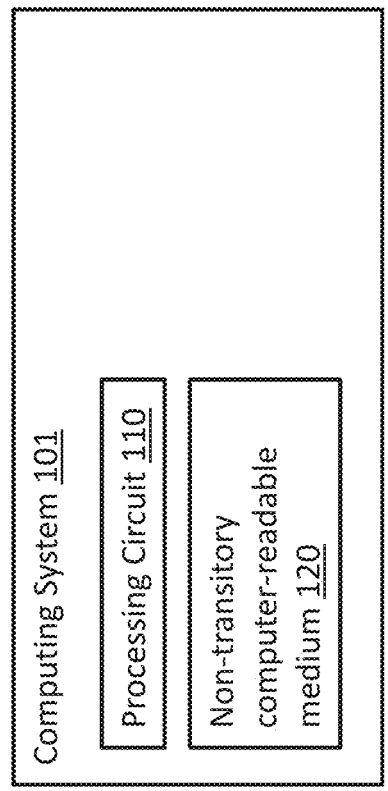
FIGS. 2A-2C provide block diagrams that illustrate a computing system for classifying an image or image portion as being textured or textureless, according to embodiments hereof FIG. 3 provides a flow diagram that illustrates a method for classifying an image or image portion as being textured or textureless, according to embodiments hereof.

FIG. 2A provides a block diagram that illustrates an embodiment of the computing system 101. The computing system 101 includes at least one processing circuit 110 and a non-transitory computer-readable medium (or media) 120. In an embodiment, the processing circuit 110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 120 may be a storage device, such as an electronic storage device, a magnetic storage device, an optical storage device, an electromagnetic storage device, a semiconductor storage device, or any suitable combination thereof, for example, such as a computer diskette, a hard disk, a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 120 may include multiple storage devices. In certain cases, the non-transitory computer-readable medium 120 is configured to store image data received from the image capture device 141. In certain cases, the non-transitory computer-readable medium 120 further stores computer readable program instructions that, when executed by the processing circuit 110, causes the processing circuit 110 to perform one or more methods described here, such as a method described with respect to FIG. 3.

Figure 2B:
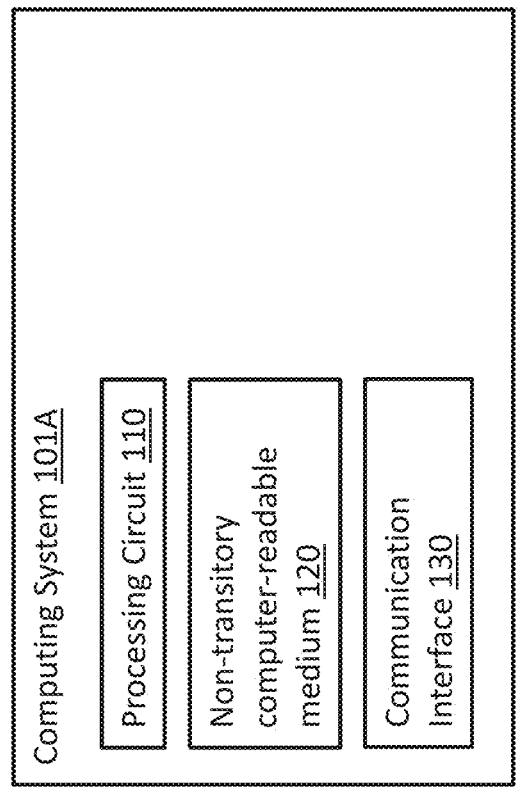

FIG. 2B depicts a computing system 101A that is an embodiment of the computing system 101 and includes a communication interface 130. The communication interface 130 may be configured to, e.g., receive an image, or more generally image data, from the image capture device 141, such as via the storage device 198 of FIG. 1B, the network 199 of FIG. 1C, or via a more direct connection. In an embodiment, the communication interface 130 may be configured to communicate with the robot 161 of FIG. 1D or the robot control system 162 of FIG. 1E. The communication interface 130 may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
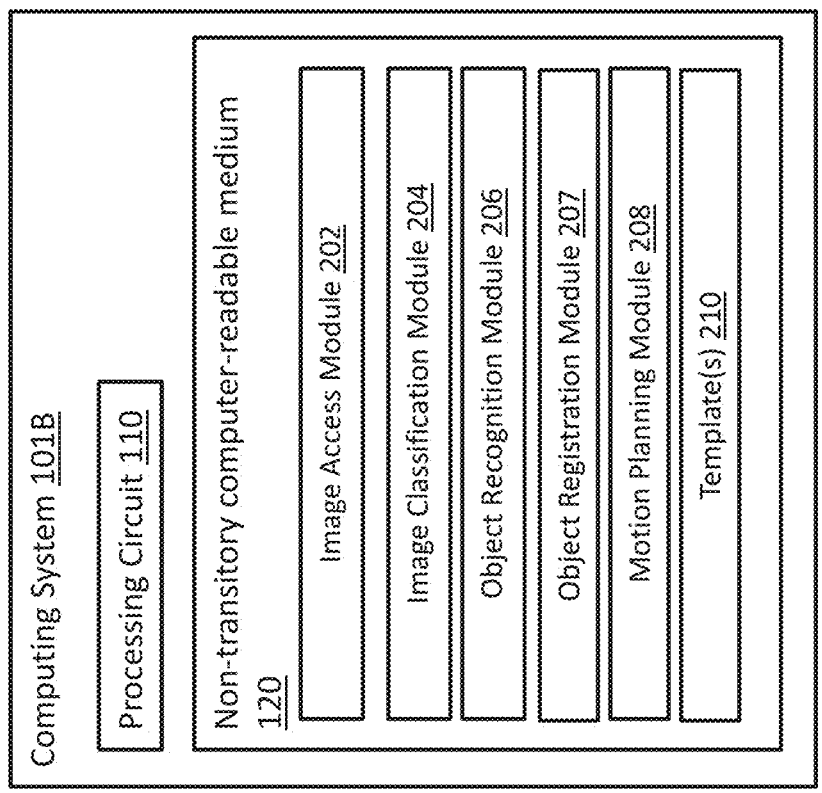

In an embodiment, the processing circuit 110 may be programmed by one or more computer-readable program instructions stored on the non-transitory computer-readable medium 120. For example, FIG. 2C illustrates a computing system 101B, which is an embodiment of the computing system 101, in which the processing circuit 110 is programmed by or is configured to execute an image access module 202, an image classification module 204, an object recognition module 206, an object registration module 207, and a motion planning module 208. It will be understood that the functionality of the various modules as discussed herein is representative and not limiting.

In an embodiment, the image access module 202 may be a software protocol operating on the computing system 101B, and may be configured to access (e.g., receive, retrieve, store) an image, or more generally image data. For example, the image access module 202 may be configured to access image data stored in non-transitory computer-readable medium 120 or 198, or via the network 199 and/or the communication interface 130 of FIG. 2B. In some cases, the image access module 202 may be configured to receive the image data directly or indirectly from the image capture device 141. The image data may be for representing one or more objects in a field of view of the image capture device 141. In an embodiment, the image classification module 204 may be configured to classify an image or an image portion as being textured or textureless, as discussed below in more detail, wherein the image may be represented by the image data accessed by the image access module 202.

In an embodiment, the object recognition module may be configured to perform object recognition based on an appearance of an object. As stated above, the object recognition may be based on one or more templates, such as the templates 210 in FIG. 2C. These templates may be stored on the computing system 101B, as depicted in FIG. 2C, or may be stored elsewhere, such as in a database hosted by another device or group of devices. In some cases, each of the templates may include or may be based on a respective image portion which the image access module 202 has received, and which the image classification module 204 has classified as being textured or textureless. The object recognition module 206 may, e.g., use the template to perform object recognition for an object appearing in another image portion. If the object recognition module 206 determines that the image portion does not match any existing template in a template storage space (e.g., the non-transitory computer-readable medium 120 or the database discussed above), or if the template storage space has no template, then the object registration module 207 may in some instances be configured to generate and store a new template based on that image portion. In an embodiment, the motion planning module 208 may be configured to perform motion planning for, e.g., controlling robot interaction with an object based on the classification performed by the image classification module 204 and/or based on a result of the object recognition module 206, as discussed below in more detail.

In various embodiments, the terms "software protocol," "software instructions," "computer instructions," "computer-readable instructions," and "computer-readable program instructions" are used to describe software instructions or computer code configured to carry out various tasks and operations. As used herein, the term "module" refers broadly to a collection of software instructions or code configured to cause the processing circuit 110 to perform one or more functional tasks. For convenience, the various modules, managers, computer instructions, and software protocols will be described as performing various operations or tasks, when, in fact, the modules, computer instructions, and software protocols program hardware processors to perform the operations and tasks. Although described in various places as "software" it is understood that the functionality performed by the "modules," "software protocols," and "computer instructions," may more generally be implemented as firmware, software, hardware, or any combination thereof. Furthermore, embodiments herein are described in terms of method steps, functional steps, and other types of occurrences. In an embodiment, these actions occur according to computer instructions or software protocols executed by processing circuit 110 of the computing system 101.

Figure 3:
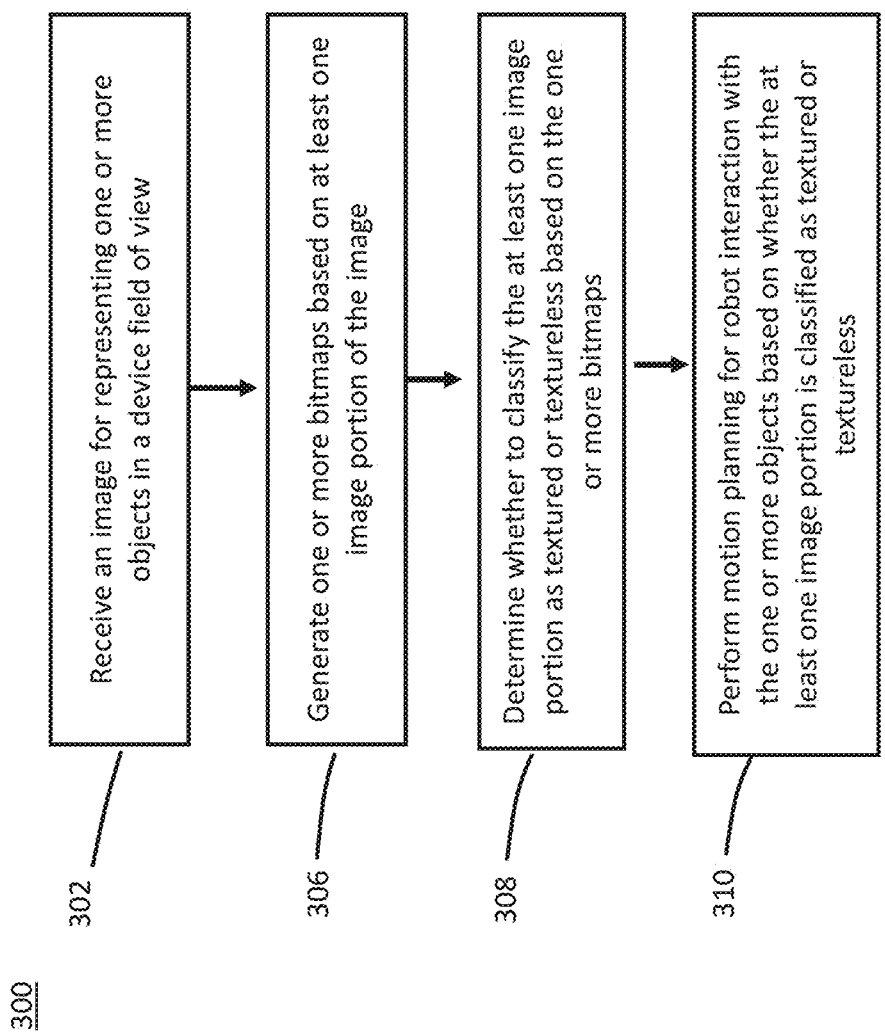
Figure 4A:
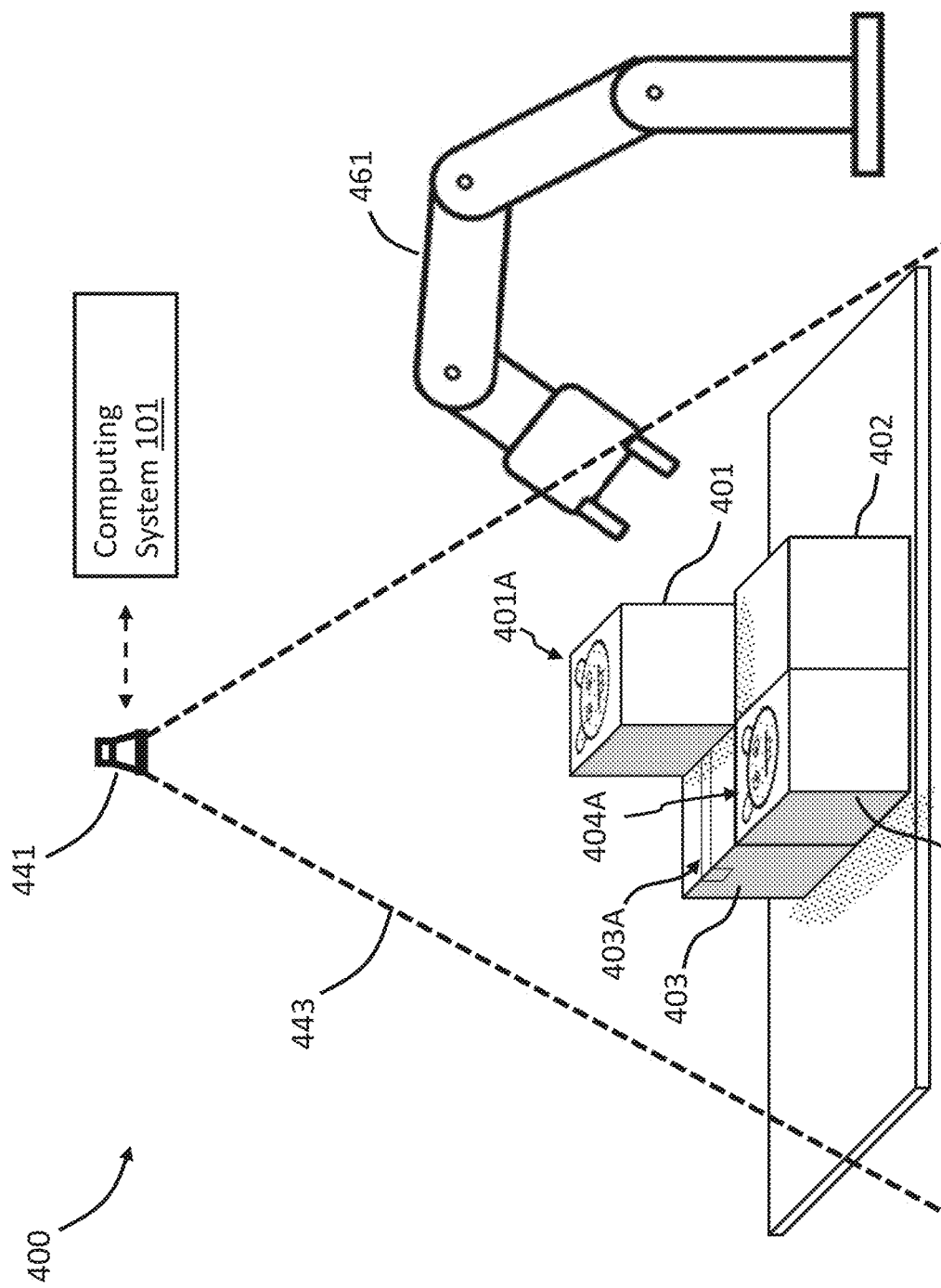
FIGS. 4A-4D illustrate an example environment in which the method of FIG. 3 is performed, according to embodiments hereof.

FIG. 3 is a flow chart that illustrates an example method 300 for classifying an image or an image portion as being textured or textureless. The image may represent, e.g., one or more objects in a warehouse, retail space, or other premises. For example, FIG. 4A depicts an environment in which the method 300 can be performed. More specifically, FIG. 4A depicts a system 400 that includes the computing system 101, a robot 461 (which may be an embodiment of the robot 161), and an image capture device 441 (which may be an embodiment of the image capture device 141) that has a device field of view 443. The image capture device 441 may be configured to generate an image which represents an appearance of a scene in the device field of view 443. For instance, when objects 401, 402, 403, 404 are in the device field of view 443, the image capture device 441 may be configured to generate an image which represents the objects 401-404, or more specifically an appearance of the objects 401-404. In one example, the objects 401-404 may be a stack of boxes or other packages to be de-palletized by the robot 461. The appearance of the objects 401-404 may include a visual marking, if any, printed or otherwise disposed on one or more surfaces of the objects 401-404. The visual marking may form or include, e.g., text, a logo or other visual design or pattern, or a picture on the surface of one or more of the objects 401-404. For example, the objects 401, 404 may be boxes that each has a picture 401A/404A printed on a respective top surface of the box 401/404. If the box 401/404 is used to hold merchandise, the picture 401A/404A or other visual marking may, e.g., identify a brand name or company associated with the merchandise and/or identify the merchandise itself or other content of the box. In some situations, the appearance of the objects 401-404 may include an outline of a physical item, if any, that is attached to a surface of one or more of the objects 401-404. For example, the object 403 may have a strip of tape 403A on its top surface. In some cases, there may be sufficient contrast between the strip of tape 403A and a surrounding region of the object 403 to allow an edge of the tape 403A to appear in an image of the object 403.

In some cases, some or all of the objects (e.g., 401-404) in the image capture device's field of view (e.g., 443) may have matching appearance or substantially matching appearance. More specifically, those objects may each include the same or substantially the same visual marking, such as the same picture. For instance, the picture 401A printed on the top surface of object 401 may be the same or substantially the same as the picture 404A printed on a top surface of object 404. In some cases, the objects (e.g., 401-404) may have matching appearance because they are all instances of a common object design. For example, the object design may be a box design for producing boxes to hold a specific merchandise or type of merchandise. Such a box design may involve a specific size and/or a specific visual design or other visual marking. Thus, objects which have the same object design may have matching appearance and/or matching size (e.g., matching dimensions).

In an embodiment, the method 300 of FIG. 3 may be performed by the computing system 101 of FIGS. 2A through 2C, and more specifically by the processing circuit 110. The method 300 may be performed when, e.g., an image for representing one or more objects (e.g., objects 401-404) is stored in the non-transitory computer-readable medium (e.g., 120 of FIGS. 2A-2C), or when the image is generated by an image capture device (e.g., 441 of FIG. 4A). In an embodiment, the non-transitory computer-readable medium (e.g., 120) may further store a plurality of instructions (e.g., computer program instructions) that, when executed by the processing circuit 110, causes the processing circuit 110 to execute the method 300.

Figure 4B:
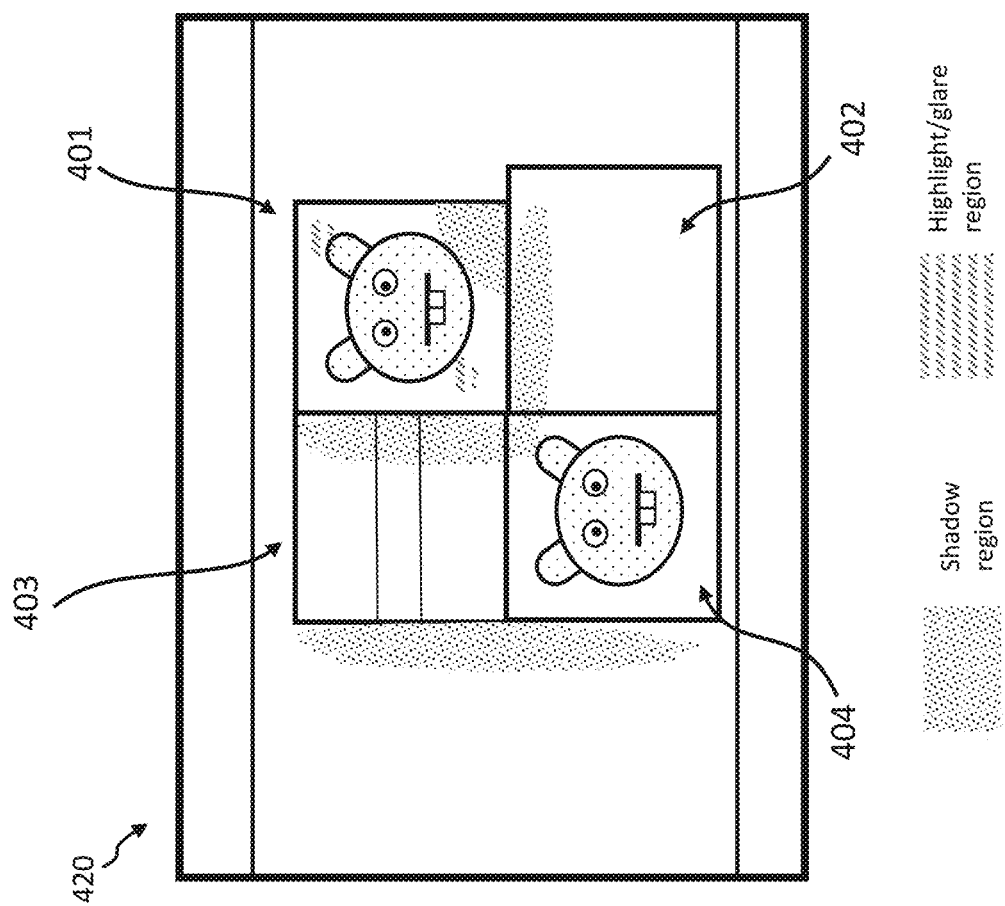

In an embodiment, method 300 of FIG. 3 may begin with or otherwise include a step 302, in which the processing circuit 110 of the computing system 101 receives an image generated by an image capture device (e.g., 141/441) for representing one or more objects (e.g., 401-404) in a device field of view (e.g., 443) of the image capture device (e.g., 141/441). For example, FIG. 4B illustrates an image 420 for representing the objects 401-404 of FIG. 4A. The image 420 may be generated by the image capture device 441, which in this example may be positioned directly above the objects 401-404. Thus, the image 420 may represent an appearance of respective top surfaces of the objects 401-404, or more specifically of a non-occluded portion(s) of the top surfaces. In other words, the image 420 in this example may represent a top perspective view that captures top surfaces of the objects 401-404. In an embodiment, the received image may be used to create one or more templates for performing object recognition, as discussed below in more detail.

Figure 4C:
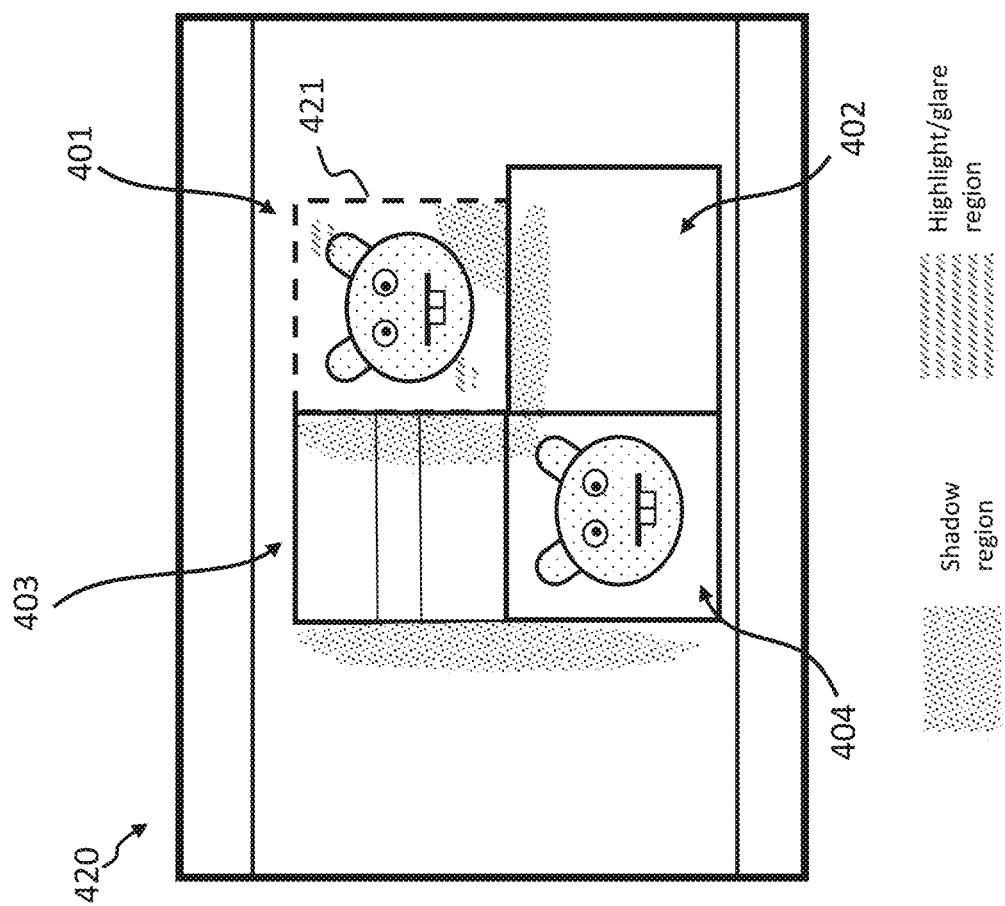

In some cases, the image that is received in step 302 may represent multiple objects, such as a stack of multiple boxes. For example, as depicted in FIG. 4B, an entirety of the received image 420 may represent multiple objects, namely objects 401-404. In this example, each of the objects 401-404 may be represented by a specific portion of the image 420 (also referred to as an image portion). For instance, as illustrated in FIG. 4C, object 401 may be represented by an image portion 421 of the image 420. The image portion 421 may be, e.g., a rectangular region (e.g., a square region) or other region of the image 420. In such an example, the method 300 may involve extracting, from the received image (e.g., 420), an image portion (e.g., 421) associated with a specific object (e.g., 401). The specific object, which may also be referred to as a target object, may be an individual object (e.g., 401), such as an individual box identified by the computing system 101. The identified object may be a target for performing object recognition or object registration and/or a target for performing robot interaction (e.g., being unloaded from a pallet).

In an embodiment, extracting the image portion 421 from the image 420 may be based on identifying locations within the image 420 (also referred to as image locations) at which edges of the object 401 appear, and extracting a region of the image 420 bounded by the image locations. In some cases, if the one or more objects 401-404 are also in a field of view of a spatial structure sensing device (e.g., 142 of FIG. 1D), the computing system 101 may be configured to receive spatial structure information generated by the spatial structure sensing device (e.g., 142), and to extract the image portion 421 with assistance from the spatial structure information. For example, the spatial structure information may include depth information, and the computing system 101 may be configured to determine locations of edges of the object 401 (also referred to as edge locations) based on the depth information, such as by detecting locations at which there is a sharp change in depth. In this example, the computing system 101 may be configured to map the edge locations sensed by the spatial structure sensing device (e.g., 142) to image locations within the image 420, and to extract a region bounded by the image locations, wherein the extracted region may be the image portion (e.g., 421).

In an embodiment, the image portion 421 may in some cases be used to generate a template for performing object recognition, and the template may be classified as being textured or textureless, as discussed below with respect to step 308. The template may represent a particular object design, or more specifically an object appearance and/or object structure associated with the object design. The object structure may describe an object size, such as an object length, object width, object height, and/or any other object dimension or combination thereof. The object recognition may involve, e.g., comparing an appearance of another object to the template, or more specifically to an object appearance described by the template. For instance, the object recognition may involve comparing a respective appearance of each of objects 402-404 to determine which object (if any) has a respective appearance that matches the template created from image portion 421. In some cases, the appearance of each of objects 402-404 may be represented by a corresponding image portion of the image 420 of FIGS. 4B and 4C. As an example, the computing system 101 may determine that an image portion representing the object 404 matches the template created from image portion 421 and the object 401 (e.g., via the object recognition module 206 of FIG. 2C). Such a match may indicate, for instance, that the object 404 has a same object design as that of object 401, and more specifically has a same object design as that represented by the template. More particularly, the match may indicate that the object 404 has a same object size (e.g., object dimensions) as that of object 401, and has an object size associated with the object design represented by the template.

As stated above, the image 420 may in some cases represent multiple objects. In other cases, the image that is received in step 302 may represent only one object (e.g., only one box). For example, before the image is received by the computing system 101, it may have been processed (e.g., cropped) by the image capture device (e.g., 141/441) or by another device so as to represent only a particular object (e.g., object 401), and to remove any portion representing other objects, if any, in the field of view (e.g., 443) of the image capture device (e.g., 141/441). In such an example, the image received in step 302 may represent only that particular object (e.g., object 401).

In an embodiment, step 302 may be performed by the image access module 202 of FIG. 2C. In an embodiment, the image (e.g., 420 of FIG. 4B) may have been stored on a non-transitory computer-readable medium (e.g., 120 of FIG. 2C), and receiving the image in step 302 may involve retrieving (or, more generally, receiving) the image (e.g., 420) from the non-transitory computer-readable medium (e.g., 120) or from any other device. In some situations, the image (e.g., 420) may have been received by the computing system 101 from the image capture device (e.g., 141/441), such as via the communication interface 130 of FIG. 2B, and may have been stored in the non-transitory computer-readable medium (e.g., 120), which may provide a temporary buffer or long-term storage for the image (e.g., 420). For instance, the image (e.g., 420) may be received from the image capture device (e.g., 141/441 of FIG. 4A) and may be stored in the non-transitory computer-readable medium (e.g., 120). The image (e.g., 420) may then be received from the non-transitory computer-readable medium by the processing circuit 110 of the computing system 101 in step 302.

In some situations, the image (e.g., 420) may be stored in the non-transitory computer-readable medium (e.g., 120), and may have been generated beforehand by the processing circuit 110 itself based on information received from the image capture device (e.g., 141/441). For instance, the processing circuit 110 may be configured to generate the image (e.g., 420) based on raw camera data received from the image capture device (e.g., 141/441) and may be configured to store the generated image in the non-transitory computer-readable medium (e.g., 120). The image may then be received by the processing circuit 110 in step 302 (e.g., by retrieving the image from the non-transitory computer-readable medium 120).

In an embodiment, the image (e.g., 420) received in step 302 may be or include a two-dimensional (2D) array of pixels, which may have respective pixel values (also referred to as pixel intensity values) associated with intensity of a signal being sensed by the image capture device 441, such as an intensity of light reflecting off respective surfaces (e.g., top surfaces) of the objects 401-404. In some cases, the image (e.g., 420) may be a grayscale image. In such cases, the image (e.g., 420) may include a single 2D array of pixels, each of which may have, e.g., an integer value or a floating point value that is in a range from 0 to 255 or some other range. In some cases, the image (e.g., 420) may be a color image. In such cases, the image (e.g., 420) may include different 2D arrays of pixels, wherein each of the 2D array of pixels may indicate intensity for a respective color component (also referred to as a respective color channels). For example, such a color image may include a first 2D array of pixels that represent a red color channel and indicate intensity for a red color component of the image (e.g., 420), a second 2D array of pixels that represent a green color channel and indicate intensity for a green color component of the image (e.g., 420), and a third 2D array of pixels that represent a blue color channel and that indicate intensity for a blue color component of the image (e.g., 420).

In an embodiment, the computing system 101 may be configured to perform a smoothing or smoothening operation on the image (e.g., 420). If the smoothening operation is performed, it may be performed as part of or after step 302 to, e.g., remove an artifact or noise (e.g., lighting noise) from the image (e.g., 420). The artifact may be due to, e.g., an irregularity (e.g., wrinkle) on an object's surface, a lighting condition effect (e.g., a shadow), or some other factor. In some cases, the smoothening operation may involve applying a structure-preserving filter, such as a Gaussian filter, on the image (e.g., 420).

Figure 4D:
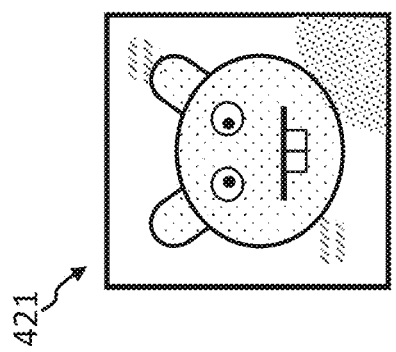

In an embodiment, the method 300 of FIG. 3 further includes a step 306, in which the processing circuit 110 of the computing system 101 generates one or more bitmaps (also referred to as one or more masks) based on at least one image portion of the image, such as at least the image portion 421 of the image 420 of FIGS. 4C and 4D. The image portion (e.g., 421) may be a portion of the image (e.g., 420) representing a particular object (e.g., 401) in the field of view (e.g., 443) of the image capture device (e.g., 441), such as an image portion representing the target object recited above. Thus, the one or more bitmaps in step 306 may be associated specifically with the target object. If the image (e.g., 420) received in step 302 represents multiple objects (e.g., 401-404), step 306 may in some instances be based on only the image portion (e.g., 421) representing the target object (e.g., 401), or based primarily on that image portion (e.g., 421). In other words, for such a scenario, the at least one image portion on which the one or more bitmaps are based may be limited primarily to the image portion representing the target object. If, in another scenario, the image received in step 302 represents only the target object, then step 306 may in some instances be based on an entirety of the image. In other words, for such a scenario, the at least one image portion on which the one or more bitmaps are based may include an entirety or almost an entirety of the image. In such an example, the image portion associated with the target object in such a scenario may occupy the entirety or substantially the entirety of the image, such that the one or more bitmaps in such a scenario may be generated based directly on an entirety or substantially the entirety of the image. In some cases, step 306 may be performed by the image classification module 204 of FIG. 2C.

In an embodiment, the one or more bitmaps may describe whether one or more visual features for feature detection are present in the at least one image portion (e.g., 421) representing an object (e.g., 401). The one or more visual features may represent visual detail that can be used to compare an appearance of the object with that of a second object (e.g., 404). Some or all of the visual detail (if any exists in the image portion) may capture or otherwise represent a visual marking (if any) printed on or otherwise appearing on the object (e.g., 401). If the image portion (e.g., 421) is used to create a template, the one or more visual features (if any) may represent visual detail described by the template, and may be used to facilitate comparison between the template and an appearance the second object (e.g., 404). In such an example, performing object recognition may involve comparing the appearance of the second object (e.g., 404) with the visual detail described by the template.

In an embodiment, the visual detail or visual features (if any) in an image portion (e.g., 421) may contribute to visual texture of the image portion (e.g., 421), or more specifically visual texture of an appearance of a surface of the object (e.g., 401) represented by the image portion (e.g., 421). The visual texture may refer to spatial variation in intensity across the image portion (e.g., 421), or more specifically to pixels of the image portion (e.g., 421) having variation among their pixel intensity values. For example, the visual detail or the one or more visual features (if any are present) may include a line, a corner, or a pattern, which may be represented by regions of pixels with non-uniform pixel intensity values. In some cases, a sharp variation among pixel intensity values may correspond to a high level of visual texture, while uniform pixel intensity values may correspond to a lack of visual texture. Presence of visual texture may facilitate more robust comparison between respective appearances of objects, or more specifically between a template generated from an appearance of a first object (e.g., 401) and an appearance of a second object (e.g., 404).

In an embodiment, some or all of the one or more bitmaps may each indicate whether the image portion (e.g., 421) has one or more visual features for feature detection, or whether the image portion lacks visual features for feature detection. If an image portion (e.g., 421) has or represents one or more visual features for feature detection, each bitmap of the one or more bitmaps may indicate a quantity or amount of visual features present in the image portion (e.g., 421), and/or indicate where the one or more visual features are located within the image portion (e.g., 421).

In an embodiment, some or all of the one or more bitmaps may each represent a particular type of visual feature. For example, the types of visual features may include descriptors as a first type of visual feature, and edges as a second type of visual feature. If multiple bitmaps are generated, they may include a first bitmap associated with identifying presence of descriptors (if any) in at least one image portion of an image, and a second bitmap associated with identifying presence of edges (if any) in the at least one image portion.

More specifically, the one or more bitmaps generated in step 306 may in an embodiment include a descriptor bitmap (also referred to as a descriptor mask) for describing whether one or more descriptors are present in the at least one image portion (e.g., 421) of the image (e.g., 420) received in step 302. As discussed below in more detail, the descriptor bitmap may indicate which region(s) of the image portion (e.g., 421) has no descriptor, and which region(s) (if any) of the image portion (e.g., 421) have descriptors. In some cases, the descriptor bitmap may act as a heat map which indicates a probability of descriptors being present at various locations of the image portion. A descriptor (also referred to as a feature descriptor) may be a type of visual feature that represents a particular visual detail appearing in the image portion (e.g., 421), such as a corner or pattern in the image portion. In some cases, the visual detail may have a sufficient level of uniqueness so as to be distinguishable in appearance from other visual details or other types of visual details in the received image (e.g., 420). In some cases, the descriptor may act as a fingerprint for that visual detail, by encoding pixels representing that visual detail into a scalar value or into a vector.

As stated above, the descriptor bitmap may indicate which location(s) or region(s) within the image portion (e.g., 421), if any, have visual detail which forms a descriptor. For example, FIG. 5A depicts an example of a descriptor bitmap 513 that is generated based on the image portion 421. In this example, the descriptor bitmap 513 may be a 2D array of pixels, and may indicate that descriptors are located at pixel coordinates $[a_1\ b_1]^T$, $[a_2\ b_2]^T$, ... $[a_n\ b_n]^T$, and/or at descriptor identification regions $514_1$, $514_2$, ... $514_n$ which surround the pixel coordinates $[a_1\ b_1]^T$, $[a_2\ b_2]^T$, ... $[a_n\ b_n]^T$, respectively. The descriptor identification regions $514_1$, $514_2$, ... $514_n$ may be circular regions, or may have some other shape (e.g., a square shape). In some cases, if a pixel value of zero indicates a lack of a descriptor, then all pixels within the descriptor identification regions $514_1$, $514_2$, ... $514_n$ of the descriptor bitmap 513 may have a non-zero value(s). The pixel coordinates $[a_1\ b_1]^T$, $[a_2\ b_2]^T$, ... $[a_n\ b_n]^T$ (also referred to as pixel locations) of the descriptor bitmap 513 may correspond to the same pixel coordinates $[a_1\ b_1]^T$, $[a_2\ b_2]^T$, ... $[a_n\ b_n]^T$ of the image portion 421. Thus, the descriptor bitmap 513 may indicate that pixel coordinates $[a_1\ b_1]^T$, $[a_2\ b_2]^T$, ... $[a_n\ b_n]^T$ of the image portion 421 have visual detail which form respective descriptors, and that those descriptors are located generally in or around regions of the image portion 421 which occupy the same locations as regions $514_1$, $514_2$, ... $514_n$.

In an embodiment, the computing system 101 may be configured to generate the descriptor bitmap by searching for one or more locations (e.g., $[a_1\ b_1]^T$ through $[a_n\ b_n]^T$) or one or more regions (e.g., $514_1$ through $514_n$) within the image portion 421 at which there is a descriptor (if any). In this embodiment, the image portion 421 may have sufficient visual detail or sufficient variation in visual detail at the one or more locations or regions to form one or more respective descriptors at such locations or regions. As an example, the computing system 101 in this embodiment may be configured to search for the one or more locations by searching at least the image portion 421 for one or more keypoints (also referred to as descriptor keypoints). Each of the one or more keypoints (if any are found) may be a location or a region at which there is a descriptor. The one or more locations (e.g., $[a_1\ b_1]^T$ through $[a_n\ b_n]^T$) or one or more regions (e.g., $514_1$ through $514_n$) may be equal to or based on the one or more keypoints. The search may be performed with a feature detection technique, such as the Harris Corner detection algorithm, the scale-invariant feature transform (SIFT) algorithm, the speeded up robust features (SURF) algorithm, the feature from accelerated segment test (FAST) detection algorithm, and/or the oriented FAST and rotated binary robust interdependent elementary features (ORB) algorithm. As an example, the computing system 101 may use the SIFT algorithm to search for keypoints in the image portion 421, wherein each keypoint may be a circular region having a keypoint center coordinate and a radius represented by a scale parameter value σ(also referred to as a keypoint scale). In this example, the coordinates $[a_1\ b_1]^T, [a_2\ b_2]^T, \ldots [a_n\ b_n]^T$ for the descriptor bitmap 513 in FIG. 5A may be equal to the keypoint center coordinates, while the descriptor identification regions $514_1$ through $514_n$ may correspond to the circular regions identified by the keypoints. More particularly, each of the descriptor identification regions (e.g., region $514_1$) may be centered at a keypoint center coordinate (e.g., $[a_1\ b_1]^T$) of a corresponding keypoint, and may have a size (e.g., radius) that is equal to or based on a scale parameter value of the corresponding keypoint.

In an embodiment, pixels of the descriptor bitmap (e.g., 513) which are within the one or more descriptor identification regions (e.g., $514_1$ through $514_n$), if any such regions are found, may have a nonzero pixel value(s), while some or all other pixels of the bitmap may have a pixel value of zero (or some other defined value). In this example, if all pixels of a particular descriptor bitmap have a pixel value of zero, the descriptor bitmap may indicate that no descriptor has been found in a corresponding image portion. Alternatively, if some pixels of the descriptor bitmap have a nonzero value(s), the descriptor bitmap (e.g., 513) may indicate a quantity or amount of descriptors in the corresponding image portion (e.g., 421). For example, a number of descriptors or descriptor identification regions in the descriptor bitmap 513 of FIG. 5A may indicate a quantity or descriptors (e.g., n descriptors) in the image portion 421. In this example, a total area of the descriptor identification regions $514_1$ through $514_n$ may indicate an amount of descriptors or descriptor information in the image portion 421. In some cases, if a descriptor identification region (e.g., $514_1$) is present in a descriptor bitmap, then a size of the descriptor identification region may indicate a size of a corresponding descriptor. For instance, a radius of the descriptor identification region $514_1$ may indicate a size of a corresponding descriptor within the image portion 421 located at pixel coordinate $[a_1\ b_1]^T$. In this example, a larger radius may correspond to the descriptor occupying a larger area.

In an embodiment, respective centers of the descriptor identification regions (if any) in a descriptor bitmap (e.g., 513) may have a defined nonzero value. For example, each of the pixel coordinates $[a_1\ b_1]^T$ through $[a_n\ b_n]^T$ in the descriptor bitmap 513 of FIG. 5A may have a defined maximum pixel value. The defined maximum pixel value may be a defined maximum value which is permitted for a pixel of the descriptor bitmap 513 (or, more generally, for a pixel of any bitmap). For example, if each pixel of the bitmap 513 is an integer value represented by 8 bits, the defined maximum pixel value may be 255. In another example, if each pixel is a floating point value that represents a probability value between 0 and 1 (for a probability of a descriptor being present at that pixel), the defined maximum pixel value may be 1. In an embodiment, pixel values of other pixel coordinates in a descriptor identification region may be less than the defined maximum pixel value, and/or may be based on how far they are from a respective center coordinate of the descriptor identification region. For instance, a pixel value for a pixel coordinate $[x\ y]^T$ in the descriptor identification region $514_1$ may be equal to or based on the defined maximum pixel value multiplied by a scaling factor which is less than 1, wherein the scaling factor may be a function (e.g., Gaussian function) of a distance between the pixel coordinate $[x\ y]^T$ and the center coordinate $[a_1\ b_1]^T$ of the descriptor identification region $514_1$.

Figure 5B:
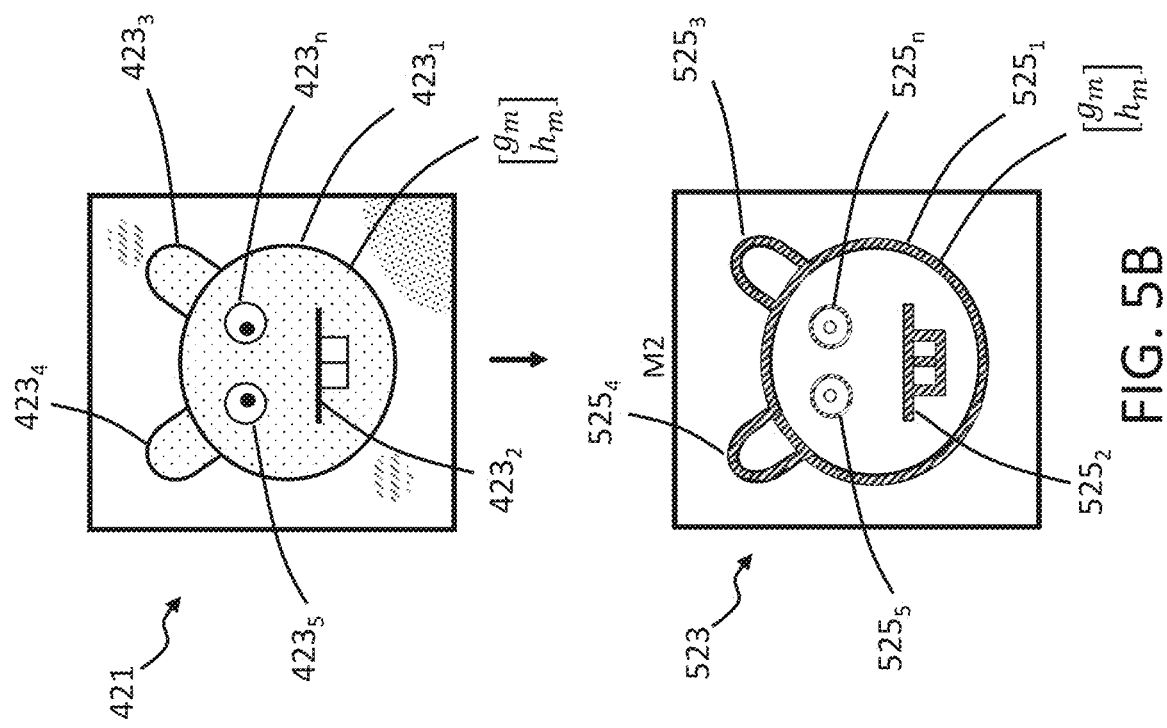

In an embodiment, the one or more bitmaps generated in step 306 may include an edge bitmap (also referred to as an edge mask) for describing whether one or more edges are present in the at least one image portion (e.g., 421) of the image (e.g., 420) received in step 302. More particularly, the edge bitmap may be for identifying one or more regions of the at least one image portion (e.g., 421) that include one or more respective edges detected from the at least one image portion (e.g., 421), or for indicating that an edge is not detected in the at least one image portion. In some cases, the edge bitmap may act as a heat map which indicates strength or probability of edges being present at various locations of the at least one image portion. As an example, FIG. 5B illustrates edges $423_1$ through $423_n$ in the image portion 421, and illustrates an edge bitmap 523 which identifies regions $525_1$ through $525_n$ corresponding to the edges $423_1$ through $423_n$ of the image portion 421. More particularly, if the edges $423_1$ through $423_n$ occupy certain edge locations (e.g., pixel coordinates $[g_m\ h_m]^T$) in the image portion 421 in FIG. 5B, the regions $525_1$ through $525_n$ (also referred to as edge identification regions) may surround those locations in the edge bitmap 523 (e.g., surround pixel coordinates $[g_m\ h_m]^T$). For instance, the edge identification regions $525_1$ through $525_n$ may form bands around those edge locations, wherein bands may have a defined band thickness or width.

In an embodiment, all pixels which are within the edge identification regions $525_1$ through $525_n$ (if any exists) may have a nonzero pixel value(s), and some or all other pixels of the edge bitmap 523 may have a pixel value of zero. If all pixels of a particular edge bitmap have a pixel value of zero, the edge bitmap may indicate that no edge is detected in a corresponding image portion. If some pixels of a particular edge bitmap have a nonzero pixel value(s), those pixels may indicate one or more locations or regions at which an edge or edges are located in the image portion 421. In an embodiment, an edge bitmap (e.g., 523) may indicate a quantity or prevalence of edges in the image portion 421. For example, a total number of edge identification regions (e.g., $525_1$ through $525_n$) in the edge bitmap may indicate a quantity of edges in the corresponding image portion (e.g., 421), and an area of the edge identification regions (e.g., $525_1$ through $525_n$) may indicate a prevalence of edges in the image portion (e.g., 421).

In an embodiment, a pixel in the edge bitmap (e.g., 523) and at an edge location (e.g., $[g_m\ h_m]^T$) may be set to a defined pixel value, such as the defined maximum pixel value discussed above. In such an embodiment, other pixels in an edge identification region (e.g., $525_1$) surrounding the edge location (e.g., surrounding $[g_m\ h_m]^T$) may have a value less than the defined maximum pixel value. For instance, pixels in an edge identification region (e.g., $525_1$) may have a pixel value which is based on their distance from an edge location. As an example, a pixel $[x\ y]^T$ in the edge identification region $525_1$ of FIG. 5B may have a pixel value which is equal to the defined maximum pixel value multiplied by a scaling factor, wherein the scaling factor is less than 1. In some cases, the scaling factor may be a function (e.g., Gaussian function) of a distance between the pixel $[x\ y]^T$ and a nearest edge location (e.g., $[g_m\ h_m]^T$).

In an embodiment, the computing system 101 may be configured to search for edge locations by using an edge detection technique, such as the Sobel edge detection algorithm, the Prewitt edge detection algorithm, the Laplacian edge detection algorithm, the Canny edge detection algorithm, or any other edge detection technique. In an embodiment, the edge detection algorithm may identify a 2D edge, such as a straight or curved line. The detection may be based on, e.g., identifying pixel coordinates at which there is a sharp change in pixel value.

Figure 5C:
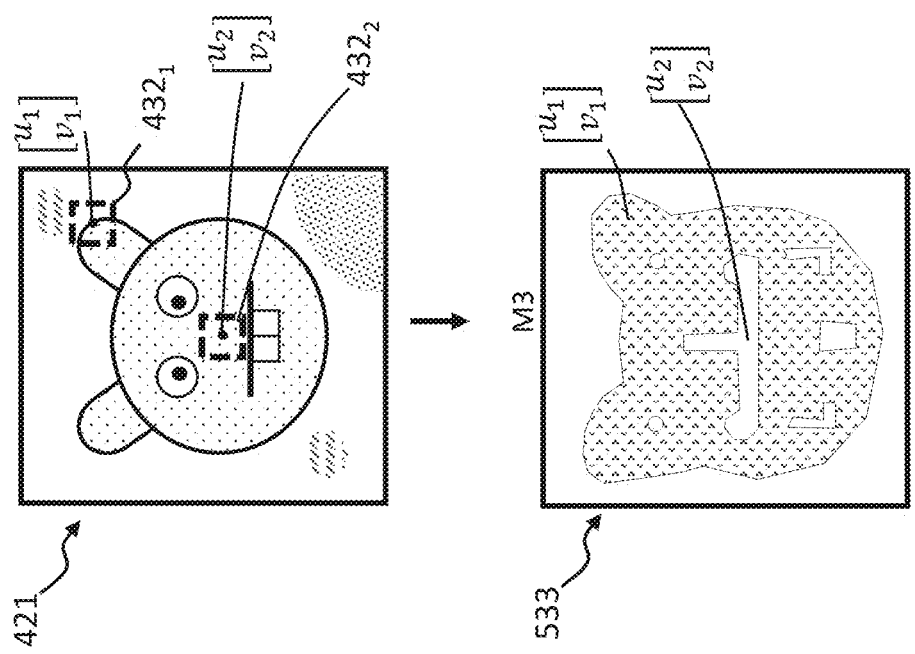

In an embodiment, the one or more bitmaps generated in step 306 may include a standard deviation bitmap (also referred to as a standard deviation mask). The standard deviation bitmap may be for describing whether intensity varies across the at least one image portion (e.g., 421), or more specifically for describing how intensity varies across the at least one image portion. For instance, the standard deviation bitmap may form a 2D array of pixels, in which each pixel of the standard deviation bitmap may indicate a standard deviation among pixel values for a corresponding region of pixels in image portion (e.g., 421). Because the standard deviation is specific to the region, it may be referred to as a local standard deviation. As an example, FIG. 5C illustrates a standard deviation bitmap 533 generated from the image portion 421. In this example, a pixel value for a particular pixel coordinate (e.g., $[u_1\ v_1]^T$ or $[u_2\ v_2]^T$) of the standard deviation bitmap 533 may be equal to or based on a local standard deviation (or other measure of variance) among pixel values in a region (e.g., $432_1$ or $432_2$) of the image portion 421 which surround the same pixel coordinate (e.g., $[u_1\ v_1]^T$ or $[u_2\ v_2]^T$). The region of pixels (e.g., $432_1$ or $432_2$) for determining the local standard deviation may be, e.g., a rectangular region having a defined size, such as a square region that is 3 pixel by 3 pixel. In some implementations, each pixel of the standard deviation bitmap may have a normalized standard deviation value, which may be equal to a standard deviation among pixel values of a corresponding region divided by a size of that corresponding region. For instance, a pixel value for $[u_1\ v_1]^T$ in the standard deviation bitmap 533 may be equal to a standard deviation among pixel values of a region $432_1$ of the image portion 421 divided by an area of the region $432_1$ (e.g., 9 square pixels).

In an embodiment, if a particular pixel of the standard deviation bitmap (e.g., 533) has a pixel value of zero or substantially zero, that pixel may indicate a local standard deviation of zero for a corresponding region of the image portion (e.g., 421). In such an embodiment, the corresponding region of the image portion (e.g., 421) may have no variation or substantially no variation among pixel values in that region. For example, the pixel at $[u_2\ v_2]^T$ in the standard deviation bitmap 533 may have a value of zero, which may indicate that a corresponding region $432_2$, which surrounds the same pixel coordinate $[u_2\ v_2]^T$ in the image portion 421, has pixels which are substantially uniform in pixel value. In an embodiment, if all pixels of a standard deviation bitmap have a pixel value of zero, the standard deviation bitmap may indicate that there is no variation in intensity across the image portion upon which the standard deviation bitmap is based. In another embodiment, if a pixel of the standard deviation bitmap has a nonzero value (e.g., at pixel coordinate $[u_1\ v_1]^T$ of bitmap 533), such a pixel may indicate that there is variation in intensity across at least a corresponding region (e.g., $432_2$) of the image portion (e.g., 421). In some cases, a higher pixel value in the standard deviation bitmap (e.g., 533) may indicate a higher local standard deviation, which may indicate a higher level of variation among pixel values in the image portion.

In an embodiment, step 306 may include generating a plurality of bitmaps, such as a first bitmap which is the descriptor bitmap (e.g., 513) and a second bitmap which is the edge bitmap (e.g., 523). In some cases, the plurality of bitmaps may include at least three bitmaps, such as the descriptor bitmap, the edge bitmap, and the standard deviation bitmap. This embodiment may allow information from the multiple bitmaps to be combined so as to produce more complete information regarding how much visual features, if any, are present in an image portion. In some cases, the plurality of bitmaps may describe multiple feature types. For instance, the first bitmap may indicate whether one or more features of a first feature type, such as descriptors, are present in the at least one image portion (e.g., 421), and the second bitmap may indicates whether one or more features of a second feature type, such as edges, are present in the at least one image portion (e.g., 421).

In an embodiment, the computing system 101 may be configured to generate one or more bitmaps that indicates an effect of lighting condition on the received image (e.g., 420) or an image portion (e.g., 421) thereof. In some scenarios, the lighting condition may result in too much light or other signal reflecting from a region of an object's surface (e.g., top surface of object 401), which may cause a glare in the resulting image portion (e.g., 421) representing the object. For instance, the light may be reflecting off a region having a shiny material (e.g., glossy tape). In some scenarios, the lighting condition may result in too little light reflecting from a region of the object's surface, which may cause a shadow in the resulting image portion. For example, the light may be blocked from fully reaching the region of the object's surface. The one or more bitmaps in this example may be referred to as one or more lighting effect bitmaps, and may be considered additional bitmaps to the plurality of bitmaps discussed above. In an embodiment, the glare or shadow in a region of an image or image portion may cause any visual detail in that region to lose contrast or appear too faint, which may render the visual detail less reliable for use in object recognition.

Figure 5D:
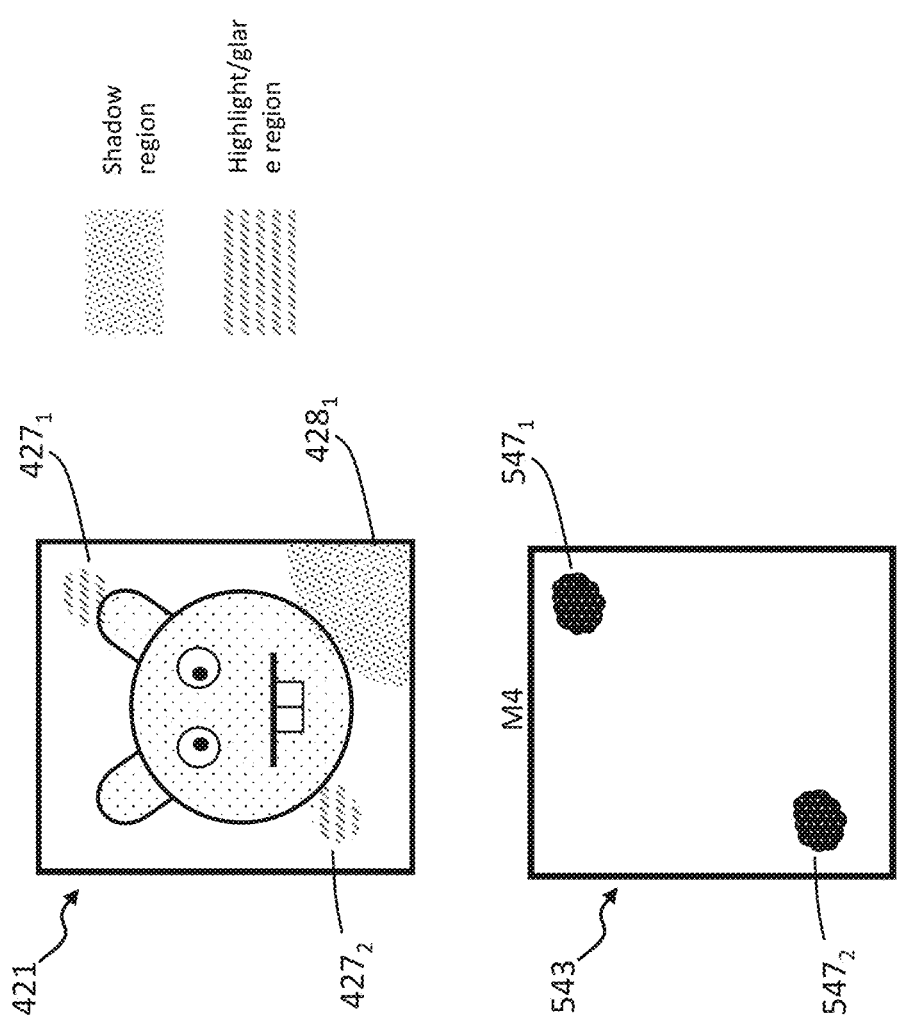

In an embodiment, the one or more lighting effect bitmaps (also referred to as one or more lighting effect masks) may include a highlight bitmap (also referred to as a highlight mask) and/or a shadow bitmap (also referred to as a shadow mask). The highlight bitmap may indicate one or more regions (if any) of a corresponding image portion (e.g., 421) that exhibit too much glare or other effect of too much light reflecting off a particular part of an object's surface. The glare may saturate a region of an image or image portion, which may cause a visual detail (if any) representing that part of the object's surface to lose contrast, or to blend in with the glare. FIG. 5D depicts an example highlight bitmap 543 generated based on the image portion 421. The highlight bitmap 543 may include a region $547_1$ and a region $547_2$ that have a pixel value(s), such as a nonzero pixel value, which indicates glare. More specifically, the regions $547_1$ and $547_2$ (which may be referred to as highlight identification regions) may indicate that glare is present in corresponding regions $427_1$ and $427_2$ of the image portion 421. The regions $427_1$ and $427_2$ of the image portion 421 (which may also be referred to as highlight regions) may occupy the same locations as the highlight identification regions $547_1$ and $547_2$ of the highlight bitmap 543. In some cases, pixels in the highlight bitmap (e.g., 543) which indicate presence of glare in the corresponding image portion (e.g., 421), such as pixels in the regions $547_1$ and $547_2$, may have a defined pixel value(s), such as the defined maximum pixel value discussed above. In other cases, pixels in the highlight identification regions of the highlight bitmap (e.g., 543) may have the same pixel values as corresponding pixels in the highlight regions of the image portion (e.g., 421). In an embodiment, all pixels which are not in at least one highlight identification region (e.g., $547_1$ and $547_2$) may have a pixel value of zero.

In an embodiment, the computing system 101 may generate the highlight bitmap by detecting glare or other overlit effect in the image portion. Such a detection may be based on, e.g., detecting pixel values of the image portion 421 which exceed a defined brightness threshold, such as the pixel values in the regions $427_1$ and $427_2$. As an example of the brightness threshold, if the pixel values are 8-bit integers in a range from 0 to 255, the defined brightness threshold may be, e.g., 230 or 240. If a pixel value at a particular pixel coordinate in the image portion 421 exceeds the defined brightness threshold, the computing system 101 may set a pixel value for the same pixel coordinate in the highlight bitmap 543 to a value (e.g., 255) associated with identifying glare.

Figure 5E:
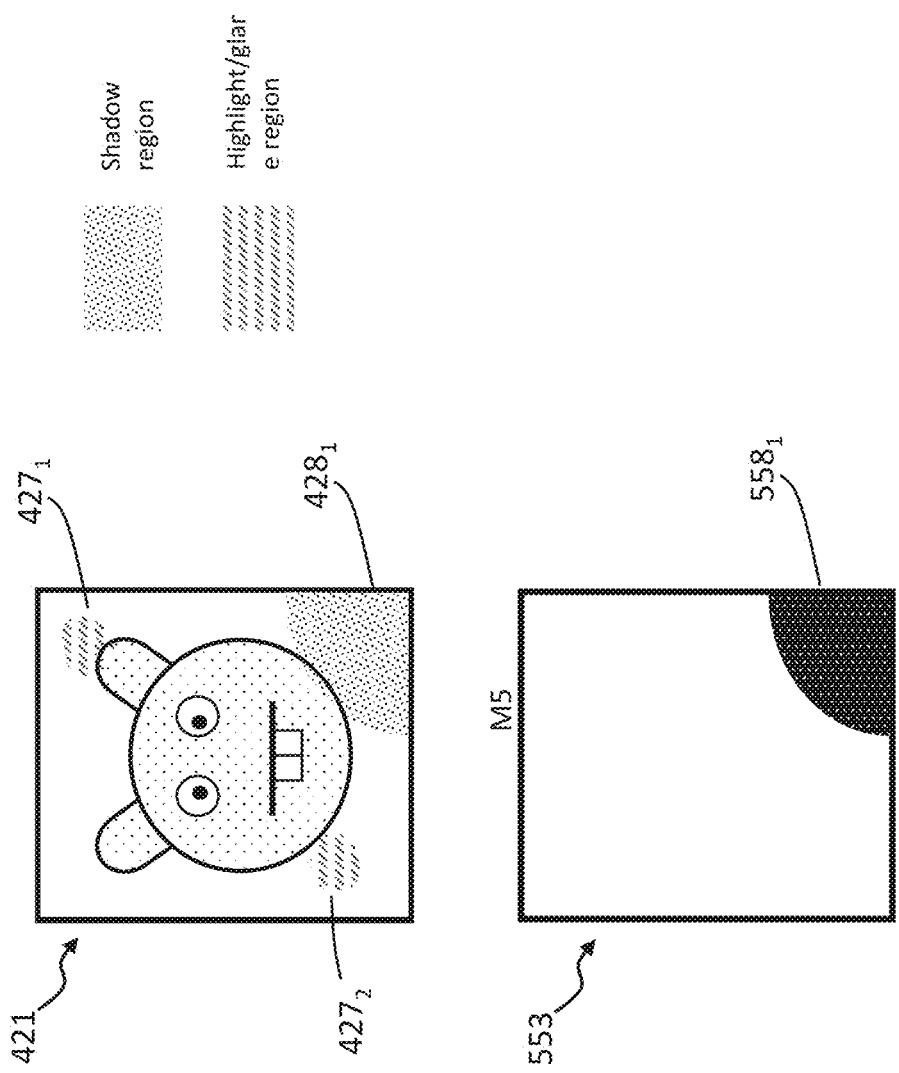

In an embodiment, the shadow bitmap may indicate a region (if any) of an image portion (e.g., 421) that represents an effect in which light was blocked from fully reaching a part of an object's surface. Such an under-lighting effect may cause a shadow to be cast on that part of the object's surface. In some instances, the shadow may cause any visual detail at that region of the image portion (e.g., 421) to appear faint or to not appear at all. For example, FIG. 5E illustrates a shadow region $428_1$ in the image portion 421. The computing system 101 may detect the shadow region $428_1$ as region of the image portion 421 with pixel values that are less than pixel values of a surrounding region by at least a defined difference threshold. In some cases, the shadow region $428_1$ may be detected as a region with pixel values that are less than a defined darkness threshold. For instance, if the pixel values are in a range from 0 to 255, the defined darkness threshold may be a pixel value of 10 or 20.

FIG. 5E further depicts a shadow bitmap 553 generated based on the image portion 421. More particularly, the shadow bitmap 553 may include a shadow identification region $558_1$ that corresponds to the shadow region $428_1$. More particularly, the shadow identification region $558_1$ may occupy the same locations in the shadow bitmap 553 as those occupied by the shadow region $428_1$ in the image portion 421. In some cases, each of the pixels in a shadow identification region (e.g., $558_1$) may have a nonzero value, while all pixels of the shadow bitmap 553 which are not in a shadow identification region may have a pixel value of zero. In some cases, the pixels in a shadow identification region, if any, of the shadow bitmap (e.g., 553) may have a defined pixel value, such as the defined maximum pixel value. In some cases, the pixels in the shadow identification region (e.g., $558_1$) may have the same pixel values as corresponding pixels in the shadow region (e.g., $428_1$).

Referring back to FIG. 3, the method 300 further includes an step 308 in which the processing circuit 110 of the computing system 101 may determine (e.g., via the image classification module 204) whether to classify the at least one image portion (e.g., 421) as textured or textureless based on the one or more bitmaps described above. Such a classification may refer to whether the image or image portion has a sufficient amount of visual texture (if any), or whether the image or image portion is substantially blank or uniform in appearance. As stated above, the at least one image portion may in some scenarios be used as a template for performing object recognition. In such a scenario, step 308 may involve determining whether to classify the template as a textured template or as a textureless template. In an embodiment, step 308 may be performed by the image classification module 208 of FIG. 2C.

In an embodiment, step 308 may involve classifying an image portion as being textured if at least one criterion of one or more criteria are satisfied. In some cases, the at least one criterion may be based on a single bitmap, such as the descriptor bitmap (e.g., 513) or the standard deviation bitmap (e.g., 533). For instance, the determining of whether to classify the at least one image portion as textured or textureless may be based on whether a total number of descriptors indicated by the descriptor bitmap (e.g., 513) exceeds a defined descriptor quantity threshold, or whether a maximum, minimum, or average of local standard deviation values in the standard deviation bitmap 533 exceeds a defined standard deviation threshold. As stated above, the descriptor bitmap (e.g., 513) may identify one or more regions of the at least one image portion (e.g., 421) that includes one or more respective descriptors, or may indicate that a descriptor is not detected in the at least one image portion (e.g., 421).

In an embodiment, the at least one criterion for causing an image portion to be classified as being textured may be based on multiple bitmaps, such as a combination of the descriptor bitmap (e.g., 513) and the edge bitmap (e.g., 523), a combination of the descriptor bitmap (e.g., 513) and the standard deviation bitmap (e.g., 533), a combination of the edge bitmap and the standard deviation bitmap, or all three bitmaps. For instance, determining whether to classify the at least one image portion as textured or textureless at the step 308 may include generating a fused bitmap (also referred to as a fused mask) which combines the multiple bitmaps, and wherein the classification is based on the fused bitmap. In some cases, the multiple bitmaps may be describing multiple respective types of features. Using multiple types of bitmaps to classify a corresponding image portion may provide the benefit of leveraging information about presence of multiple types of features or lack thereof, which may provide a more complete assessment of how much or how many features (if any) are present in an image or image portion. For instance, an image portion may have a particular visual detail (e.g., a pink region bordering a white region) that may not be identified as a feature by a first bitmap, but that may be identified as a feature by a second bitmap.

In an embodiment, generating a fused bitmap may involve generating a sum of multiple bitmaps, or more specifically a weighted sum of the multiple bitmaps. For example, the fused bitmap may be equal to or based on M1*W1+M2*W2, or M1*W1+M2*W2+M3*W3, wherein M1 may refer to a first bitmap (e.g., descriptor bitmap), M2 may refer to a second bitmap (e.g., edge bitmap), and M3 may be a third bitmap (e.g., standard deviation bitmap), and wherein W1, W2, and W3 may be respective weights associated with the bitmaps M1, M2, and M3. In this example, the bitmaps M1, M2, and M3 may be referred to as feature or variation bitmaps, because they represent presence of features in an image portion (or represent lack of features), or represent variation in intensity across the image portion (or represent a lack of variation). In an embodiment, a sum or other combination of the feature or variation bitmaps may be referred to as a combined feature or variation bitmap. Generating a weighted sum of the feature or variation bitmaps may involve, e.g., adding the bitmaps on a pixel-by-pixel basis. For instance, a pixel value for a pixel coordinate $[x\ y]^T$ of the fused bitmap may be equal to a sum of: W1 multiplied by a pixel value for $[x\ y]^T$ of the first bitmap M1; W2 multiplied by a pixel value of $[x\ y]^T$ of the second bitmap M2; and W3 multiplied by a pixel value of $[x\ y]^T$ of the third bitmap M3. In an embodiment, the weights W1, W2, W3 may be predefined. In an embodiment, the weights W1, W2, and W3 may be determined by the computing system 101 via a machine learning algorithm, as discussed below in more detail.

In an embodiment, generating the fused bitmap may further be based on the one or more lighting effect bitmaps, such as the highlight bitmap (e.g., 543) and the shadow bitmap (e.g., 553). For instance, the computing system 101 may determine pixel values, also referred to as bitmap pixel values, that describe visual texture levels across at least one image portion (e.g., 421) of an image. The bitmap pixel values may be based on the combined feature or variation bitmap discussed above, such as pixel values of M1*W1+ M2*W2, or M1*W1+M2*W2+M3*W3. In this example, the computing system 101 may reduce or otherwise adjust a subset of the determined bitmap pixel values of the combined feature or variation bitmap, wherein the adjustment may be based on the highlight map (e.g., 543) and/or the shadow bitmap (e.g., 553). For instance, the highlight bitmap or shadow bitmap may identify one or more regions of the at least one image portion (e.g., 421) as exhibiting glare or as being or as being in a shadow. The computing system 101 may make and adjustment that reduces bitmap pixel values in the same one or more regions of the combined feature or variation bitmap. The reduction may decrease an influence of pixel values in those one or more regions on classifying an image portion as being textured or textureless, because those bitmap pixel values may be affected by a lighting effect that decreases reliability or quality of visual information from those regions. In an embodiment, the reduction may be based on multiplying the combined feature or variation bitmap by the highlight bitmap and/or the shadow bitmap.

As an example of the above discussion, FIG. 6 illustrates a fused bitmap 631 being generated based on combining feature bitmaps and lighting effect bitmaps. More specifically, FIG. 6 depicts the computing system 101 generating the fused bitmap as being equal to (M1*W1+M2*W2+ M3*W3)*(M4*W4+M5*W5), wherein M4 is the highlight bitmap, M5 is the shadow bitmap, and W4 and W5 are respective weights associated with the bitmaps M4 and M5. In this example, M1*W1+M2*W2+M3*W3 may form a combined feature or variation bitmap 621, which may be multiplied by a combined lighting effect bitmap 623 equal to (M4*W4+M5*W5).

As stated above, the weights W1 through W5 may in an example be determined via a machine learning technique. For instance, the machine learning technique may involve using training data to determine optimal values for the weights W1 through W5. In some cases, the training data may include training images or training image portions, which may be images or image portions with predefined classification as to whether they are textured or textureless. In such cases, the computing system 101 may be configured to determine optimal value of the weights W1 through W5 which minimizes classification error for the training images. For instance, the computing system 101 may be configured to use a gradient descent process to adjust the weights W1 through W5 toward their optimal values.

In an embodiment, the computing system 101 may be configured to determine values for the weights W1 through W5 based on predefined information regarding objects that are likely to be within an image capture device's field of view (e.g., 443). For example, if the computing system 101 receives an indication (e.g., from a warehouse manager) that an image capture device (e.g., 441) has photographed or will photograph objects that are likely to have many visual markings that will appear as edges, then the weight W2 may be assigned a relatively higher value so as to emphasize the edge bitmap M2. If the computing system 101 receives an indication that the objects are likely to have visual markings that form descriptors, then the weight W1 may be assigned a relatively higher value to emphasize the descriptor bitmap M1. In some cases, the computing system 101 may be configured to determine values for the weights W1 through W5 based on a downstream analysis, such as a determination of which bitmaps have more information (e.g., more non-zero values). In such an example, the weight for a bitmap (e.g., M1) that has more information may be assigned a relatively higher weight. In some cases, the computing system 101 may be configured to assign values to the weights based on a defined preference for which type of feature detection is to be used or emphasized. For instance, if the defined preference indicates that an edge-based detection is to be emphasized, the computing system may assign a relatively higher value to W2. If the defined preference indicates that a descriptor-based detection is to be emphasized, the computing system may assign a relatively higher value to W1.

Figure 7:
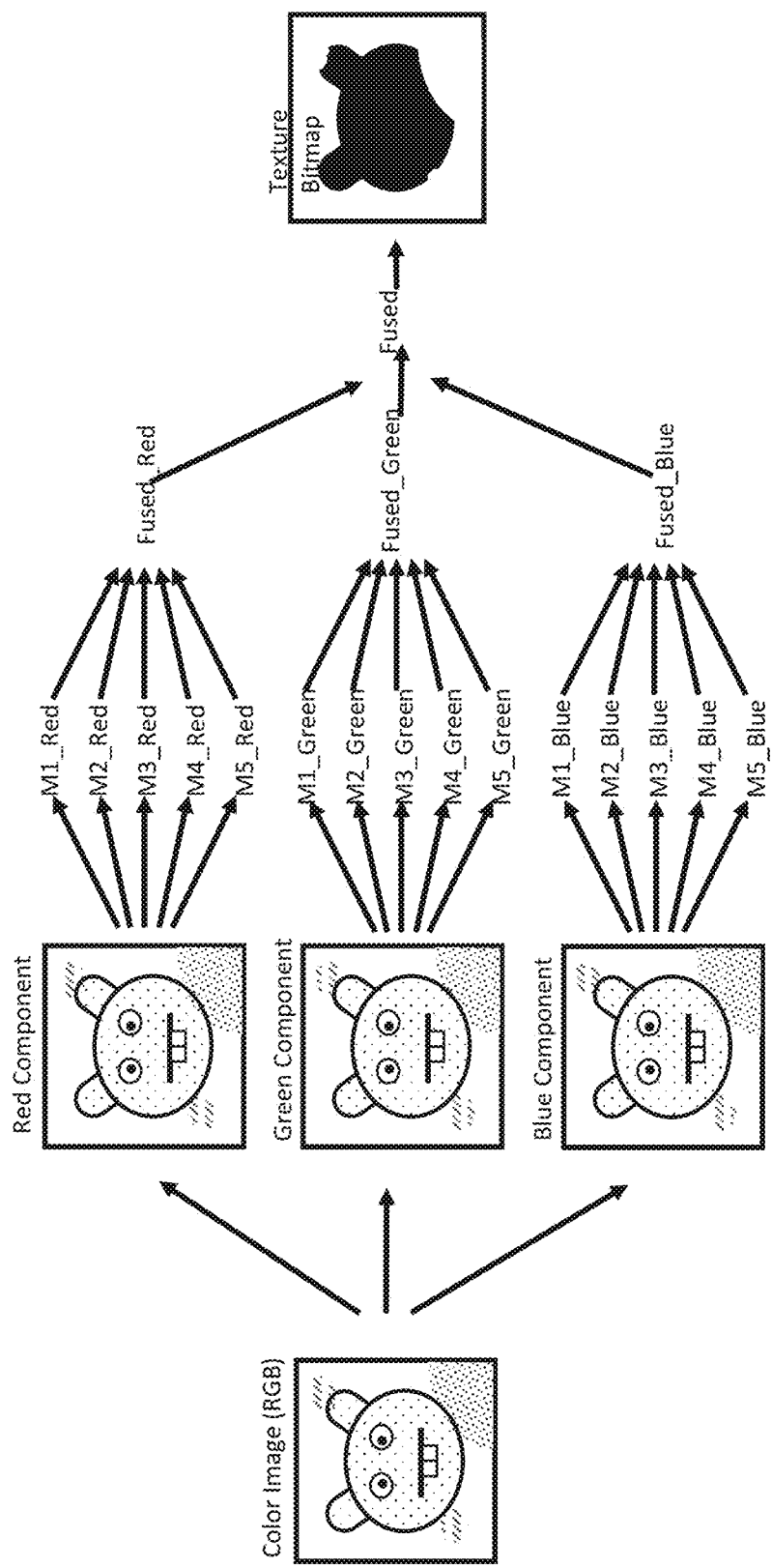
FIG. 7 illustrates a fused bitmap being generated from a color image, according to embodiments hereof.

In an embodiment, if the image (e.g., 420) received in step 302 is a color image having multiple color components, generating the fused bitmap (e.g., 631) may involve generating respective intermediate fused bitmaps corresponding to the color components, and then combining the intermediate fused bitmaps. More specifically, FIG. 7 illustrates a color image having a red color component, a green color component, and a blue color component. In such an example, the computing system 101 may be configured to generate at least a first set of bitmaps (M1_Red through M5_Red) corresponding to a first color component (e.g., red) and a second set of bitmaps (M1_Green through M5_Green) corresponding to a second color component (e.g., green). In the example of FIG. 7, the computing system 101 may further generate a third set of bitmaps (M1_Blue through M5_Blue) corresponding to a third color component (e.g., blue). In this embodiment, a respective intermediate fused bitmap, such as Fused_Red, Fused_Green, and Fused_Blue may be generated from each of the three sets of bitmaps. The three intermediate fused bitmaps may be combined into a single fused bitmap, such as the bitmap 631 of FIG. 6.

As stated above, the classification in step 308 may be based on a standard deviation bitmap (e.g., 533), which may represent variation in intensity across at least one image portion of an image. In an embodiment, at least one criterion for causing an image portion to be classified as being textured may be based on variation in intensity across the fused bitmap (e.g., 631). The variation across the fused bitmap may be quantified with, e.g., standard deviation values of localized regions in the fused bitmap. For instance, if a maximum, minimum, or average of such local standard deviation values is equal to or greater than a defined standard deviation threshold, the computing system 101 may classify the at least one image portion as being textured.

In an embodiment, step 308 may involve generating a texture bitmap based on the fused bitmap. In such an embodiment, at least one criterion for causing an image portion to be classified as being textured may be based on the texture bitmap. FIG. 6 depicts the fused bitmap 631 being converted to a texture bitmap 641. In an embodiment, a texture bitmap may be for identifying which one or more region(s) of a corresponding image portion (e.g., 421) has a sufficient level of visual texture, or for indicating that the image portion (e.g., 421) has no region with a sufficient level of visual texture. More specifically, the texture bitmap may have a texture identification region and/or a textureless identification region. The texture identification region, such as region 643 of the texture bitmap 641, may have a pixel value(s) for indicating that a corresponding region of the image portion, which may be referred to as a textured region, has at least a defined texture level. The textureless identification region, such as the region 645 in the texture bitmap 641, may have a pixel value(s) for indicating that a corresponding region of the image portion, which may be referred to as a textureless region, does not have the defined texture level. The texture region in the image portion (e.g., 421) may occupy the same locations (e.g., same coordinates) as those occupied by the texture identification region 643 in the texture bitmap 641. Similarly, the textureless region in the image portion may occupy the same locations as those occupied by the textureless identification region 645 in the texture bitmap 641. Thus, the texture bitmap 641 may be for identifying how much (if any) of the image portion has a sufficient level of visual texture, and how much (if any) of the image portion lacks the sufficient level of visual texture.

In an embodiment, the computing system 101 may be configured to generate the texture bitmap (e.g., 641) by comparing pixels of the fused bitmap (e.g., 631) against a defined texture level threshold, such as a defined pixel value threshold. In such an example, the computing system 101 may determine, for each pixel coordinate of the fused bitmap (e.g., 631), whether a pixel value of the fused bitmap (e.g., 631) at that pixel coordinate is equal to or exceed the defined pixel value threshold. If the pixel value of the fused bitmap at that pixel coordinate is equal to or exceeds the defined pixel value threshold, the computing system 101 may assign, e.g., a nonzero value to the same pixel coordinate in the texture bitmap (e.g., 641). As an example, the pixel coordinate assigned the nonzero value may be one that is in the texture identification region 643. While the above discussion involves assigning a nonzero value, any value that is associated with indicating a sufficient level of texture may be assigned. If the pixel value of the fused bitmap (e.g., 631) at that pixel coordinate is less than the defined pixel value threshold, the computing system 101 may assign, e.g., a value of zero to the same pixel coordinate in the texture bitmap. As an example, the pixel coordinate assigned the zero value may be one that is in the textureless identification region 645. While the above discussion involve assigning a value of zero, any value that is associated with indicating an insufficient level of texture may be assigned.

In an embodiment, the texture bitmap may be a binary mask, in which all pixels in the texture bitmap can have only one of two pixel values, such as either 0 or 1. For instance, all pixels in the texture identification region 643 of the texture bitmap 641 may have a pixel value of 1, while all pixels in the textureless identification region 645 may have a value of 0. In this example, the pixels having the pixel value of 1 in the texture bitmap may indicate that a corresponding region of the image portion (e.g., 421) is a textured region, while the pixels having the pixel value of 0 in the texture bitmap 641 may indicate that a corresponding region of the image portion (e.g., 421) is a textureless region.

In an embodiment, the at least one criterion which causes an image portion (e.g., 421) to be classified as being textured may be based on a size (e.g., total area) of one or more texture identification regions (if any) in the texture bitmap (e.g., 641) or on a size of one or more textureless identification regions (if any) in the texture bitmap (e.g., 641). The criterion may also be based on a size of one or more textured regions (if any) of the image portion (e.g., 421) or on a size of one or more textureless regions (if any) of the image portion. The size of the one or more texture identification regions (if any) may be equal or substantially equal to the size of the one or more textured regions (if any), while the size of the one or more textureless identification regions (if any) may be equal to or substantially equal to the size of the one or more textureless regions (if any).

As an example of the above criterion, the computing system 101 may determine a total textured area indicated by the texture bitmap, and may classify the image portion (e.g., 421) as being textured or textureless based on the total textured area. The total textured area may indicate a total area of all texture identification regions (e.g., 643) in the texture bitmap (e.g., 641) or of all corresponding textured regions in the image portion (e.g., 421). If the texture bitmap (e.g., 641) has no texture identification region, or if the image portion (e.g., 421) has no textured region, the total textured area may be zero. In some cases, the computing system 101 may classify the image portion (e.g., 421) as being textured if the total textured area is equal to or larger than a defined area threshold, and may classify the image portion (e.g., 421) as being textureless if the total textured area is less than the defined area threshold.

In an embodiment, the at least one criterion which causes an image portion to be classified as being textured or textureless may be based on a percentage $P_{texture}$, which may be a percentage of the image portion (e.g., 421) occupied by one or more textured regions, if any, or a percentage of the texture bitmap (e.g., 641) occupied by one or more texture identification regions (e.g., 643), if any. If the image portion has no textured region, or if the corresponding texture bitmap has no texture identification region, the percentage $P_{texture}$ may be zero. In an embodiment, the at least one criterion may be based on a percentage $P_{textureless}$, which may be a percentage of the image portion (e.g., 421) occupied by one or more textureless regions, if any, or a percentage of the texture bitmap (e.g., 641) occupied by one or more textureless identification regions (e.g., 643), if any.

In an embodiment, the at least one criterion which causes an image portion to be classified as being textured or textureless may be based on a ratio between the percentage $P_{texture}$ (which may be a first percentage in this example) and the percentage $P_{textureless}$ (which may be a second percentage in this example). For instance, such an embodiment may involve classifying the at least one image portion (e.g., 421) as being textured if a ratio $P_{texture}/P_{textureless}$ exceeds a defined textured-textureless comparison threshold $T_1$ (e.g., 5).

In an embodiment, the at least one criterion that causes the image portion (e.g., 421) to be classified as being textured or textureless may be based on a ratio between the percentage $P_{texture}$ and a total number of pixels $Num_{image}$ in the image portion (e.g., 421) or in the image (e.g., 420) received in step 302, and/or based on a ratio between the percentage $P_{textureless}$ and $Num_{image}$. For example, the computing system 101 may classify at least the image portion (e.g., 421) as being textured if a ratio $P_{texture}/Num_{image}$ is greater than a defined texture-image-size-comparison threshold $T_2$ (e.g., 0.9), and/or if a ratio $P_{textureless}/Num_{image}$ is less than a defined textureless-image-size-comparison threshold $T_3$ (e.g., 0.1).

In an embodiment, the computing system 101 may combine some or all of the above criteria involved in classifying an image portion as being textured or textureless. In some cases, the computing system 101 may be configured to perform step 308 by classifying an image portion (e.g., 421) if any one of the above criteria is satisfied, and classifying an image portion as being textureless if some or none of the above criteria are not satisfied.

For example, the computing system 101 may determine, as part of evaluating a first criterion, whether the number of descriptors in the descriptor bitmap (e.g., 513) is greater than the defined descriptor quantity threshold. If this first criterion is satisfied, the computing system 101 may classify the image portion (e.g., 421) as being textured. If the first criterion is not satisfied, the computing system 101 may evaluate a second criterion by determining whether $P_{texture}/P_{textureless} > T_1$. If the second criterion is satisfied, the computing system 101 may classify the image portion (e.g., 421) as being textured. If the second criterion is not satisfied, the computing system 101 may evaluate a third criterion by determining whether $P_{textureless}/Num_{image} > T_2$ and/or $P_{textureless}/Num_{image} < T_3$. If the third criterion is satisfied, the computing system 101 may classify the image portion (e.g., 421) as being textured. If the third criterion is not satisfied, the computing system 101 may evaluate a fourth criterion by determining whether a maximum, minimum, or mean of standard deviation values indicated by the standard deviation bitmap (e.g., 533) or by the fused bitmap (e.g., 631) is greater than the defined standard deviation threshold. If the fourth criterion is satisfied, the computing system may classify the image portion (e.g., 421) as being textured. If none of the above criteria are satisfied, the computing system 101 may classify the image portion (e.g., 421) as being textureless.

In an embodiment, steps 306 and 308 may be repeated for one or more other image portions of the image received in step 302. For instance, the received image (e.g., 420) may represent multiple objects, such as objects 401-404 in FIG. 4A. In some situations, more than one template may be generated based on the multiple objects. As an example, a first template may be generated based on an image portion 421, which describes an appearance of the object 401, as discussed above. In this embodiment, a second template may be generated based on second image portion 422, while a third template may be generated based on a third image portion 423, which are depicted in FIGS. 8A-8C. The image portion 422 may represent object 402, while the image portion 423 may represent the object 403. The computing system 101 in this example may extract the image portions 422 and 423 from the image 420, and perform steps 306 and 308 on those image portions 422, 423 so as to generate a second template and a third template, respectively, based on those image portions. In one example, the image portion 422 may be classified as a textureless template. In some implementations, the image portion 423 may also be classified as a textureless template. Although the image portion 423 may display one or more edges of a strip of tape, the feature bitmap(s), variation bitmaps, and fused bitmaps generated from the one or more edges alone may be insufficient in this example to produce a textured classification.

Returning to FIG. 3, the method 300 may include a step 310 in which the processing circuit 110 of the computing system 101 may perform motion planning for robot interaction with the one or more objects (e.g., 401-404 of FIG. 4A) based on whether the at least one image portion (e.g., 421) is classified as textured or textureless. In an embodiment, step 308 may be performed by the image classification module 204 and/or the motion planning module 208 of FIG. 2C.

In an embodiment, step 310 may involve performing object recognition for one or more of the objects in a device field of view (e.g., 443) of an image capture device (e.g., 441), such as the one or more objects 401-404 represented by the image 420. For instance, as discussed above, the image portion 421 representing the object 401 may be used as a template, or to generate a template, and the object recognition may involve determining whether remaining objects 402-404 in the device field of view 443 match the template. As an example, the computing system 101 may be configured to determine whether a portion of the image 420 representing the object 402, 403, or 404 matches the template, wherein the template is generated based on an appearance of the object 401. In some cases, the object recognition may be based on whether the template is classified as a textured template or as a textureless template. For example, the classification of the template may affect where the template is stored, and/or how long the template is stored. Performing object recognition based on a textureless template or textured template is discussed in more detail in U.S. patent application Ser. No. 16/991,466, entitled "METHOD AND COMPUTING SYSTEM FOR OBJECT RECOGNITION OR OBJECT REGISTRATION BASED ON IMAGE CLASSIFICATION", filed on even date herewith, the entire content of which is incorporated by reference herein. As stated above, the object recognition may produce information about, e.g., an object's size, which may be used to plan robot interaction with that object (e.g., 404). In an embodiment, step 310 may be omitted. For instance, such an embodiment may include a method that has steps 302, 306, 308, and that stops upon completion of step 308.

In an embodiment, the computing system 101 may be configured to determine a level of confidence in the object recognition, wherein the determination may be based on whether the template is textured or is textureless. For example, if an appearance of an object (e.g., 403) matches only a textureless template, such a match may be assigned a relatively low confidence level. If an appearance of an object (e.g., 404) matches a textured template, such a match may be assigned a relatively high confidence level. In some cases, the computing system 101 may be configured to perform an additional object recognition operation, such as one that is based on another technique or based on additional information, so as to attempt to improve a robustness of the object recognition. In some cases, the computing system 101 may perform motion planning based on the confidence level. For example, if the confidence level is relatively low, the computing system 101 may be configured to limit a speed of a robot (e.g., 461) when the robot is attempting to pick up or otherwise interact with the object, so that the robot interaction may proceed with a higher level of caution.

Additional Discussion of Various Embodiments

Embodiment 1 relates to a method of image classification. The method may be performed by, e.g., a computing system executing instructions on a non-transitory computer-readable medium. The method in this embodiment includes receiving an image by a computing system, wherein the computing system is configured to communicate with an image capture device, wherein the image is generated by the image capture device, and is for representing one or more objects in a field of view of the image capture device. The method further includes generating, by the computing system, one or more bitmaps based on at least one image portion of the image, wherein the one or more bitmaps and the at least one image portion are associated with a first object of the one or more objects, and wherein the one or more bitmaps describe whether one or more visual features for feature detection are present in the at least one image portion, or describe whether there is variation in intensity across the at least one image portion. Additionally, the method includes determining, by the computing system, whether to classify the at least one image portion as textured or textureless based on the one or more bitmaps, and performing motion planning for robot interaction with the one or more objects based on whether the at least one image portion is classified as textured or textureless.

Embodiment 2 includes the method of embodiment 1. In this embodiment, the one or more bitmaps include a descriptor bitmap for indicating whether one or more descriptors are present in the at least one image portion, or for identifying one or more regions of the at least one image portion that include one or more respective descriptors detected from the at least one image portion. The determining of whether to classify the at least one image portion as textured or textureless is based on whether a total number of descriptors identified by the descriptor bitmap exceeds a defined descriptor quantity threshold.

Embodiment 3 includes the method of embodiment 1 or 2. In this embodiment, the one or more bitmaps include a plurality of bitmaps having a first bitmap and a second bitmap. The first bitmap is generated based on the at least one image portion, and describes whether one or more visual features of a first feature type are present in the at least one image portion. Further in this embodiment, the second bitmap is generated based on the at least one image portion, and describes whether one or more visual features of a second feature type are present in the at least one image portion, and wherein the determining of whether to classify the at least one image portion as textured or textureless includes generating a fused bitmap which combines the plurality of bitmaps, and wherein the at least one image portion is classified as textured or textureless based on the fused bitmap.

Embodiment 4 includes the method of embodiment 3. In this embodiment, the first bitmap is a descriptor bitmap for identifying one or more regions of the at least one image portion that include one or more respective descriptors detected from the at least one image portion, or for indicating that a descriptor is not detected in the at least one image portion, and wherein the second bitmap is an edge bitmap for identifying one or more regions of the at least one image portion that include one or more respective edges detected from the at least one image portion, or for indicating that an edge is not detected in the at least one image portion.

Embodiment 5 includes the method of the embodiment 4. In this embodiment, the plurality of bitmaps include a third bitmap that is a standard deviation bitmap for indicating, for each pixel of the at least one image portion, a standard deviation among pixel intensity values around the pixel.

Embodiment 6 includes the method of any one of embodiments 3-5. In this embodiment, the determining of whether to classify the at least one image portion is textured or textureless includes converting, by the computing system, the fused bitmap into a texture bitmap. Further in this embodiment, the texture bitmap is for identifying one or more textured regions of the at least one image portion or is for indicating that the at least one image portion does not have a textured region, wherein the texture bitmap is for further identifying one or more textureless regions of the at least one image portion or is for indicating that the at least one image portion does not have a textureless region, wherein the one or more textured regions are one or more regions of the at least one image portion that have at least a defined texture level, and the one or more textureless regions are one or more regions of the at least one image portion that have less than the defined texture level; and wherein the determining of whether to classify the at least one image portion as textured or textureless is based on the texture bitmap.

Embodiment 7 includes the method of embodiment 6. In this embodiment, the determining of whether to classify the at least one image portion as textured or textureless is based on at least one of: a total textured area indicated by the texture bitmap, wherein the total textured area is a total area of the one or more textured regions, or is zero if the texture bitmap indicates that the at least one image portion has no textured region.

Embodiment 8 includes the method of any one of embodiments 3-7. In this embodiment, the determining of whether to classify the at least one image portion as textured or textureless is based on whether there is variation in pixel intensity values across the fused bitmap, or is based on an amount of variation in pixel intensity values across the fused bitmap.

Embodiment 9 includes the method of any one of embodiments 2-8. In this embodiment, the determining of whether to classify the at least one image portion as textured or textureless includes at least one of: a) classifying the at least one image portion as textured if a number of descriptors identified by the descriptor bitmap is greater than a defined descriptor quantity threshold, b) classifying the at least one image portion as textured if a ratio between a first percentage and a second percentage exceeds a defined texture-textureless-comparison threshold, wherein the first percentage is a percentage of the at least one image portion occupied by the one or more textured regions, or is zero if the at least one image portion does not have a textured region, and the second percentage is a percentage of the at least one image portion occupied by the one or more textureless regions, c) classifying the at least one image portion as textured if a ratio between the first percentage and a size of the at least one image portion is greater than a defined texture-image-size-comparison threshold or if a ratio between the second percentage and the size of the at least one image portion is less than a defined textureless-image-size-comparison threshold, or d) classifying the at least one image portion as textured if a maximum value or a minimum value of standard deviation for local regions of respective pixels of the fused bitmap is greater than a defined standard deviation threshold.

Embodiment 10 includes the method of any one of embodiments 1-9. In this embodiment, the method further comprises generating an additional bitmap that describes an effect on the at least one image portion from a lighting condition in which the image was generated.

Embodiment 11 includes the method of embodiment 10. In this embodiment, the additional bitmap includes at least one of: a highlight bitmap that identifies one or more regions in the at least one image portion that exceed a defined brightness threshold as a result of the lighting condition, or a shadow bitmap that identifies one or more regions in the at least one image portion being in a shadow.

Embodiment 12 includes the method of any one of embodiments 3-11. In this embodiment, generating the fused bitmap includes determining, based at least on the first bitmap and the second bitmap, bitmap pixel values which describe texture levels across the at least one image portion; and reducing a subset of the determined bitmap pixel values based on the highlight bitmap or the shadow bitmap, wherein the subset of bitmap pixel values that are reduced correspond to one or more regions of the at least one image portion identified by the highlight bitmap as exceeding the defined brightness threshold or identified by the shadow bitmap as being in a shadow.

Embodiment 13 includes the method of any one of embodiments 3-12. In this embodiment, generating the fused bitmap is based on a weighted sum of at least the first bitmap and the second bitmap, and on a weighted sum of the highlight bitmap and the shadow bitmap.

Embodiment 14 includes the method of any one of embodiments 3-13. In this embodiment, the image received by the computing system is a color image including a plurality of color components, wherein the first bitmap and the second bitmap belong to a first set of bitmaps which are associated with a first color component of the plurality of color components, and wherein the method comprises generating a second set of bitmaps which are associated with a second color component of the plurality of color components, and wherein the fused bitmap is generated based on at least the first set of bitmaps and the second set of bitmaps.

Embodiment 15 includes the method of embodiment 14. In this embodiment, the method further comprises: generating a first intermediate fused bitmap that combines the first set of bitmaps, wherein the first intermediate fused bitmap is associated with the first color component; generating a second intermediate fused bitmap that combines the second set of bitmaps, wherein the second intermediate fused bitmap is associated with the second color component, and wherein the fused bitmap is generated by combining at least the first intermediate fused bitmap and the second intermediate fused bitmap.

Embodiment 16 includes the method of any one of embodiments 1-15. In this embodiment, the method further comprises applying, before the one or more bitmaps are generated, a smoothing operation to the image to produce an updated image, wherein the at least one image from which the one or more bitmaps are generated is extracted from the updated image.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A method of image classification, comprising:
receiving an image by a computing system, wherein the computing system is configured to communicate with an image capture device, wherein the image is generated by the image capture device, and is for representing one or more objects in a field of view of the image capture device;

generating, by the computing system, one or more bitmaps based on at least one image portion of the image, wherein the one or more bitmaps and the at least one image portion are associated with a first object of the one or more objects, and wherein the one or more bitmaps describe whether one or more visual features for feature detection are present in the at least one image portion, or describe whether there is variation in intensity across the at least one image portion;

determining, by the computing system, whether to classify the at least one image portion as textured or textureless based on the one or more bitmaps; and performing motion planning for robot interaction with the one or more objects based on whether the at least one image portion is classified as textured or textureless.

2. The method of claim 1, wherein the one or more bitmaps include a descriptor bitmap for indicating whether one or more descriptors are present in the at least one image portion, or for identifying one or more regions of the at least one image portion that include one or more respective descriptors detected from the at least one image portion, and
wherein the determining of whether to classify the at least one image portion as textured or textureless is based on whether a total number of descriptors identified by the descriptor bitmap exceeds a defined descriptor quantity threshold.

3. The method of claim 1, wherein the one or more bitmaps include a plurality of bitmaps having a first bitmap and a second bitmap,
wherein the first bitmap is generated based on the at least one image portion, and describes whether one or more visual features of a first feature type are present in the at least one image portion,
wherein the second bitmap is generated based on the at least one image portion, and describes whether one or more visual features of a second feature type are present in the at least one image portion, and
wherein determining whether to classify the at least one image portion as textured or textureless includes generating a fused bitmap which combines the plurality of bitmaps, and wherein the at least one image portion is classified as textured or textureless based on the fused bitmap.

4. The method of claim 3, wherein the first bitmap is a descriptor bitmap for identifying one or more regions of the at least one image portion that include one or more respective descriptors detected from the at least one image portion, or for indicating that a descriptor is not detected in the at least one image portion, and
wherein the second bitmap is an edge bitmap for identifying one or more regions of the at least one image portion that include one or more respective edges detected from the at least one image portion, or for indicating that an edge is not detected in the at least one image portion.

5. The method of claim 4, wherein the plurality of bitmaps include a third bitmap that is a standard deviation bitmap for indicating, for each pixel of the at least one image portion, a standard deviation among pixel intensity values around the pixel.

6. The method of claim 4, wherein the determining of whether to classify the at least one image portion is textured or textureless includes converting, by the computing system, the fused bitmap into a texture bitmap, wherein the texture bitmap is for identifying one or more textured regions of the at least one image portion or is for indicating that the at least one image portion does not have a textured region, wherein the texture bitmap is for further identifying one or more textureless regions of the at least one image portion or is for indicating that the at least one image portion does not have a textureless region, wherein the one or more textured regions are one or more regions of the at least one image portion that have at least a defined texture level, and the one or more textureless regions are one or more regions of the at least one image portion that have less than the defined texture level, and wherein the determining of whether to classify the at least one image portion as textured or textureless is based on the texture bitmap.

7. The method of claim 6, wherein the determining of whether to classify the at least one image portion as textured or textureless is based on at least one of: a total textured area indicated by the texture bitmap, wherein the total textured area is a total area of the one or more textured regions, or is zero if the texture bitmap indicates that the at least one image portion has no textured region.

8. The method of claim 6, wherein the determining of whether to classify the at least one image portion as textured or textureless is based on whether there is variation in pixel intensity values across the fused bitmap, or is based on an amount of variation in pixel intensity values across the fused bitmap.

9. The method of claim 6, wherein the determining of whether to classify the at least one image portion as textured or textureless includes at least one of:
   a) classifying the at least one image portion as textured if a number of descriptors identified by the descriptor bitmap is greater than a defined descriptor quantity threshold,
   b) classifying the at least one image portion as textured if a ratio between a first percentage and a second percentage exceeds a defined texture-textureless-comparison threshold, wherein the first percentage is a percentage of the at least one image portion occupied by the one or more textured regions, or is zero if the at least one image portion does not have a textured region, and the second percentage is a percentage of the at least one image portion occupied by the one or more textureless regions,
   c) classifying the at least one image portion as textured if a ratio between the first percentage and a size of the at least one image portion is greater than a defined texture-image-size-comparison threshold or if a ratio between the second percentage and the size of the at least one image portion is less than a defined texture-less-image-size-comparison threshold, or
   d) classifying the at least one image portion as textured if a maximum value or a minimum value of standard deviation for local regions of respective pixels of the fused bitmap is greater than a defined standard deviation threshold.

10. The method of claim 3, further comprising generating an additional bitmap that describes an effect on the at least one image portion from a lighting condition in which the image was generated.

11. The method of claim 10, wherein the additional bitmap includes at least one of:
   a highlight bitmap that identifies one or more regions in the at least one image portion that exceed a defined brightness threshold as a result of the lighting condition, or
   a shadow bitmap that identifies one or more regions in the at least one image portion being in a shadow.

12. The method of claim 11, wherein generating the fused bitmap includes:
   determining, based at least on the first bitmap and the second bitmap, bitmap pixel values which describe texture levels across the at least one image portion; and
   reducing a subset of the determined bitmap pixel values based on the highlight bitmap or the shadow bitmap, wherein the subset of bitmap pixel values that are reduced correspond to one or more regions of the at least one image portion identified by the highlight bitmap as exceeding the defined brightness threshold or identified by the shadow bitmap as being in a shadow.

13. The method of claim 11, wherein generating the fused bitmap is based on a weighted sum of at least the first bitmap and the second bitmap, and on a weighted sum of the highlight bitmap and the shadow bitmap.

14. The method of claim 3, wherein the image received by the computing system is a color image including a plurality of color components,
   wherein the first bitmap and the second bitmap belong to a first set of bitmaps which are associated with a first color component of the plurality of color components, and wherein the method comprises generating a second set of bitmaps which are associated with a second color component of the plurality of color components, and
   wherein the fused bitmap is generated based on at least the first set of bitmaps and the second set of bitmaps.

15. The method of claim 14, further comprising:
   generating a first intermediate fused bitmap that combines the first set of bitmaps, wherein the first intermediate fused bitmap is associated with the first color component;
   generating a second intermediate fused bitmap that combines the second set of bitmaps, wherein the second intermediate fused bitmap is associated with the second color component, and
   wherein the fused bitmap is generated by combining at least the first intermediate fused bitmap and the second intermediate fused bitmap.

16. The method of claim 1, further comprising applying, before the one or more bitmaps are generated, a smoothing operation to the image to produce an updated image, wherein the at least one image from which the one or more bitmaps are generated is extracted from the updated image.

17. A computing system for image classification, comprising:
   a non-transitory computer-readable medium;
   at least one processing circuit configured, when the non-transitory computer-readable medium has stored an image generated by an image capture device for representing one or more objects in a field of view of the image capture device, to perform the following:
   receive the image;
   generate one or more bitmaps based on at least one image portion of the image, wherein the one or more bitmaps and the at least one image portion are associated with a first object of the one or more objects, and wherein the one or more bitmaps describe whether one or more visual features for feature detection are present in the at least one image portion, or describe whether there is variation in intensity across the at least one image portion;

determine whether to classify the at least one image portion as textured or textureless based on the one or more bitmaps; and perform motion planning for robot interaction with the one or more objects based on whether the at least one image portion is classified as textured or textureless.

18. The computing system of claim 17, wherein the one or more bitmaps include a descriptor bitmap for indicating whether one or more descriptors are present in the at least one image portion, or for identifying one or more regions of the at least one image portion that include one or more respective descriptors detected from the at least one image portion, and wherein the at least one processing circuit is configured to determine whether to classify the at least one image portion as textured or textureless based on whether a total number of descriptors identified by the descriptor bitmap exceeds a defined descriptor quantity threshold.

19. The computing system of claim 17, wherein the one or more bitmaps include a plurality of bitmaps having a first bitmap and a second bitmap, wherein the first bitmap is generated based on the at least one image portion, and describes whether one or more visual features of a first feature type are present in the at least one image portion, wherein the second bitmap is generated based on the at least one image portion, and describes whether one or more visual features of a second feature type are present in the at least one image portion, and wherein the at least one processing circuit is configured to determine whether to classify the at least one image portion as textured or textureless by generating a fused bitmap which combines the plurality of bitmaps, and wherein the at least one image portion is classified as textured or textureless based on the fused bitmap.

20. A non-transitory computer-readable medium having instructions stored thereon that, when executed by at least one processing circuit of a computing system, causes the at least one processing circuit to:

receive an image, wherein the computing system is configured to communicate with an image capture device, wherein the image is generated by the image capture device, and is for representing one or more objects in a field of view of the image capture device;

generate one or more bitmaps based on at least one image portion of the image, wherein the one or more bitmaps and the at least one image portion are associated with a first object of the one or more objects, and wherein the one or more bitmaps describe whether one or more visual features for feature detection are present in the at least one image portion, or describe whether there is variation in intensity across the at least one image portion;

determine whether to classify the at least one image portion as textured or textureless based on the one or more bitmaps; and perform motion planning for robot interaction with the one or more objects based on whether the at least one image portion is classified as textured or textureless.

* * * * *